United States Patent [19]
Doucet et al.

[11] Patent Number: 5,786,923
[45] Date of Patent: Jul. 28, 1998

[54] POINT-TO-MULTIPOINT WIDE AREA TELECOMMUNICATIONS NETWORK VIA ATMOSPHERIC LASER TRANSMISSION THROUGH A REMOTE OPTICAL ROUTER

[75] Inventors: Mark A. Doucet; David L. Panak, both of College Station, Tex.

[73] Assignee: Dominion Communications, LLC, Bryan, Tex.

[21] Appl. No.: 625,725

[22] Filed: Mar. 29, 1996

[51] Int. Cl.$^6$ .................................................. H04B 10/00
[52] U.S. Cl. ..................... 359/172; 359/152; 359/118; 359/125
[58] Field of Search ............................ 359/143, 118, 359/152, 172, 128, 125, 139, 159, 169–170, 176, 178

[56] References Cited

U.S. PATENT DOCUMENTS

| | | | |
|---|---|---|---|
| 4,358,858 | 11/1982 | Tamura et al. | 359/152 |
| 4,533,247 | 8/1985 | Epworth | 356/345 |

(List continued on next page.)

FOREIGN PATENT DOCUMENTS

| | | | |
|---|---|---|---|
| 0018326 | 1/1989 | Japan | 359/152 |

OTHER PUBLICATIONS

Marketing Brochure entitled "Atmospheric Infared Transmission for Data/Voice", American Laser Systems, Inc., 2 pps.
"VIPSLAN–10", JVC Marketing Information, 6 pps.
"VIPSLAN–10 Streaks Off the Wire", LAN Magazine, Sep. 1995, 2 pps.

(List continued on next page.)

*Primary Examiner*—Knife-Michael Negash
*Attorney, Agent, or Firm*—E. Alan Davis; Jeffrey C. Hood; Conley, Rose & Tayon

[57] ABSTRACT

A point-to-multipoint bi-directional wide area telecommunications network employing atmospheric optical communication. The network comprises a primary transceiver unit, a plurality of subscriber transceiver units and an optical router. The primary transceiver unit generates a first light beam on which it modulates first data. The primary transceiver unit atmospherically transmits the first light beam to the optical router which demodulates the first data, modulates the first data on a second light beam and transmits the second light beam to the plurality of subscriber transceiver units in multiplexed manner. The subscriber transceiver units receive the second light beam and demodulate the first data from the second light beam. Conversely, the subscriber transceiver units atmospherically transmit a third light beam on which they modulate second data to the optical router which demodulates the second data, modulates the second data on a fourth light beam and transmits the fourth light beam to the primary transceiver unit. The primary transceiver unit atmospherically receives the fourth light beam and demodulates the respective second data from the fourth light beam. The optical router of the network comprises a secondary transceiver unit, a plurality of transceiver modules and an electronic router for routing data between the secondary transceiver unit and the plurality of transceiver modules to establish communication channels between the primary transceiver unit and the plurality of subscriber transceiver units. The secondary transceiver unit communicates with the primary transceiver unit and the transceiver modules communicate with the subscriber transceiver units. The transceiver modules comprise an X–Y beam deflector for deflecting the second and third light beams to a portion of the subscriber transceiver units in a time-multiplexed fashion. In an alternate embodiment of the optical router, the first light beam is redirected to the subscriber transceiver units and the third light beam is redirected to the primary transceiver unit by a mirror and lens set assembly rather than being demodulated and modulated in the router. Applications such as telephony, the Internet, teleconferencing, radio broadcast, HDTV, interactive TV, and other television forms are contemplated for employment on the network.

106 Claims, 10 Drawing Sheets

U.S. PATENT DOCUMENTS

| | | | |
|---|---|---|---|
| 4,627,106 | 12/1986 | Drake | 455/617 |
| 4,662,004 | 4/1987 | Fredriksen et al. | 455/607 |
| 4,727,600 | 2/1988 | Avakian | 359/172 |
| 4,796,301 | 1/1989 | Uzawa et al. | 359/172 |
| 4,823,402 | 4/1989 | Brooks | 455/607 |
| 4,847,481 | 7/1989 | Altmann | 250/203 R |
| 4,888,816 | 12/1989 | Sica, Jr. | 455/607 |
| 4,975,926 | 12/1990 | Knapp | 375/1 |
| 4,977,618 | 12/1990 | Allen | 455/607 |
| 4,982,445 | 1/1991 | Grant et al. | 455/600 |
| 4,987,607 | 1/1991 | Gilbreath et al. | 455/618 |
| 5,060,304 | 10/1991 | Solinsky | 359/152 |
| 5,068,916 | 11/1991 | Harrisen et al. | 455/39 |
| 5,087,982 | 2/1992 | Smothers | 370/1 |
| 5,090,795 | 2/1992 | O'Meara et al. | 359/240 |
| 5,099,346 | 3/1992 | Lee et al. | 359/118 |
| 5,121,243 | 6/1992 | Miyahira et al. | 359/158 |
| 5,191,461 | 3/1993 | Cranshaw et al. | 359/154 |
| 5,198,918 | 3/1993 | Freitas et al. | 359/172 |
| 5,218,467 | 6/1993 | Ross et al. | 359/172 |
| 5,229,593 | 7/1993 | Cato | 250/205 |
| 5,247,380 | 9/1993 | Lee et al. | 359/110 |
| 5,247,381 | 9/1993 | Olmstead et al. | 359/172 |
| 5,282,073 | 1/1994 | Defour et al. | 359/143 |
| 5,297,144 | 3/1994 | Gilbert et al. | 359/118 |
| 5,321,542 | 6/1994 | Freitas et al. | 359/172 |
| 5,321,849 | 6/1994 | Lemson | 455/67.1 |
| 5,343,287 | 8/1994 | Wilkins | 356/141.3 |
| 5,359,189 | 10/1994 | Savicki | 250/216 |
| 5,359,446 | 10/1994 | Johnson et al. | 359/152 |
| 5,363,221 | 11/1994 | Sutton et al. | 359/11 |
| 5,371,623 | 12/1994 | Eastmond et al. | 359/178 |
| 5,390,040 | 2/1995 | Mayeux | 359/152 |

OTHER PUBLICATIONS

"Omnibeam 4000", The Solutions Group, Advanced Network Solutions, 1995, 2 pps.

United States Statutory Invention Registration for "Covert Beam Projector", Reg. No. H299, Miller, Jr., Jul. 7, 1987.

Lehmann, R., "Brueckenschlag," Nachrichten Elektronik UND Telematik, vol. 50, No. 3, Mar. 1, 1996, pp. 26–27.

International Search Report for PCT/US 97/04935 dated Jul. 18, 1997.

POINT-TO-MULTIPOINT WIDE AREA TELECOMMUNICATIONS NETWORK VIA ATMOSPHERIC LASER TRANSMISSION THROUGH A REMOTE OPTICAL ROUTER

FIELD OF THE INVENTION

The present invention relates generally to wireless telecommunications networks, and more particularly to a broadband communications network which employs atmospheric, or free-space laser transmission.

DESCRIPTION OF THE RELATED ART

Broadband communications applications such as interactive television, video telephony, video conferencing, video messaging, video on demand, high definition television (HDTV) and high-speed data services require a broadband communications network between and to the various subscribers. The current telecommunications network, referred to as the Public Switched Telephone Network (PSTN) or the plain old telephone system (POTS), is presently the only wired network that is accessible to almost the entire population. This system, although ideally suited and designed for point-to-point transmission and any-to-any connectivity, has become nearly overloaded with the use of voice, fax and data communications.

The PSTN today primarily comprises digital switching systems, and transmission over the local loop is typically by either T1 feeder copper-based systems or fiber optic cable systems. However, the subscriber loop is still primarily copper unshielded twisted pair (UTP) wiring, which has a limited capacity. Therefore, the physical nature of the system is severely bandwidth limited, with data transmissions typically in the 9,600-28,800 bits per second range. Thus, high speed broadband applications cannot feasibly be based on POTS technology.

New hard-wired systems, such as ISDN (Integrated Services Digital Network) and fiber optic networks, offer high speed bi-directional communications available to many individuals. However, ISDN itself may not provide sufficient bandwidth for many broadband communications applications. In addition, ISDN requires that most subscribers be connected with upgraded copper wire. A fiber based network, such as fiber to the curb (FTTC) and fiber to the home (FTTH), requires that new fiber optic cable be run to every subscriber. The cost of implementing a fiber optic network across the United States would be very expensive. Other alternatives for increasing the capacity of existing networks include ADSL (Asymmetric Digital Subscriber Line), SDSL (Symmetric Digital Subscriber Line), and HFC (Hybrid Fiber Coax), among others.

An alternative to hard wired network solutions is a wireless-based solution. Most currently existing methods for wireless telecommunications are based upon broadcast methodology in the electromagnetic spectrum. One example of a wireless broadcast medium is the Direct Broadcast Satellite (DBS) system, such as "DirecTV". In general, broadcast systems are widespread and numerous. However, available bandwidth is increasingly limited by the sheer volume of subscribers, especially with the rapid growth in the cellular phone market. The result of this "crowding of the bands" is that the wireless electromagnetic systems are unable to meet the voracious need of the public for high speed data communications.

Another method for broadband point-to-point communications employs lasers in a point-to-point system that establishes a single continuous, high-speed, bi-directional, multi-channel, atmospheric connection. Laser based wireless systems have been developed for establishing point-to-point, bi-directional and high speed telecommunications through the atmosphere. The range for such systems is typically 0.5 to 1.2 miles, with some having a range of 4 miles or more. The longest atmospheric communications path achieved with a point-to-point system exceeded 100 miles. These single path systems require a laser and transceiver optics at each end of the connection. The connections are capable of maintaining high speed bi-directional communications in some of the most severe inclement weather conditions. The cost of such systems are typically in the $10,000 to $20,000 dollar range however, making them unsuitable for most home and business use.

Therefore, a wireless, laser based telecommunications system is desired that enables a number of subscribers to share a communications path to a great number of subscribers. A wireless, laser based telecommunications system is further desired which reduces the cost to each subscriber, yet still provides high speed, bi-directional, broadband, wide area telecommunications. A system is desired which does not require huge installation costs of ISDN and fiber optics, and which does not require any of the electromagnetic broadcast bands of the mobile communication systems. Such a network could be employed in a wide variety of applications such as telephony, data communications such as the Internet, teleconferencing, radio broadcast, and various television applications such as cable television, HDTV and interactive TV.

SUMMARY OF THE INVENTION

The present invention comprises a point-to-multipoint bi-directional wide area telecommunications network employing atmospheric optical communication. The network comprises a primary transceiver unit, an optical router, and a plurality of subscriber transceiver units. The primary transceiver unit generates a first light beam which includes first modulated data. The optical router receives the first light beam and demodulates the first data. The optical router modulates the first data onto a second light beam and transmits the second light beam to the subscriber transceiver units. The optical router demodulates, modulates and transmits to each of the subscriber transceiver units in a time-multiplexed fashion.

The subscriber transceiver units receive the second light beam and demodulate the first data. Each subscriber transceiver unit comprises an optical antenna or other optical receiver/transmitter. The optical antenna is preferably coupled to an input/output device such as a set-top box or display system, e.g., a computer or television, by a fiber optic cable.

In the other direction, the subscriber transceiver units atmospherically transmit a third light beam which includes second modulated data to the optical router. The optical router demodulates the second data, modulates the second data on a fourth light beam, and transmits the fourth light beam to the primary transceiver unit. The primary transceiver unit receives and demodulates the second data. The optical router demodulates, modulates and transmits to each of the subscriber transceiver units in a time-multiplexed fashion. Thereby, bi-directional communication channels between the primary transceiver unit and the plurality of subscriber transceiver units are established for transferring data in each direction.

The preferred embodiment of the optical router comprises a secondary transceiver unit, a plurality of transceiver modules and an electronic router for routing data between the secondary transceiver unit and the plurality of transceiver modules to establish the communication channels between the primary transceiver unit and the plurality of subscriber transceiver units. The secondary transceiver unit transceives light beams including data with the primary transceiver unit and the transceiver modules transceives light beams including data with the subscriber transceiver units. The transceiver modules comprise an X-Y beam deflector for deflecting the light beams to a portion of the subscriber transceiver units in a time-multiplexed fashion.

In an alternate embodiment of the optical router, the optical router simply redirects the light beams between the primary transceiver unit and the subscriber transceiver units in a time-multiplexed fashion rather than demodulating and remodulating the data. The alternate optical router employs a mirror and lens set to redirect the light beams.

Therefore, the present invention comprises a laser-based atmospheric communication network which provides broadband bi-directional communications to a plurality of subscribers. The present invention provides a bi-directional broadband optical communication network with significantly reduced infrastructure costs. A network of such networks comprising multiple optical routers and multiple primary transceiver units is further contemplated by the present invention.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

The following references are hereby incorporated by reference.

For general information on broadband telecommunications and optical data communications, please see Lee, Kang and Lee, *Broadband Telecommunications Technology* Artech House, 1993 which is hereby incorporated by reference in its entirety. Also please see Davis, Carome, Weik, Ezekiel, and Einzig, *Fiber Optic Sensor Technology Handbook*, Optical Technologies Inc., 1982; 1986. Herndon Va., which is hereby incorporated by reference in its entirety.

The Network

Figure 1:
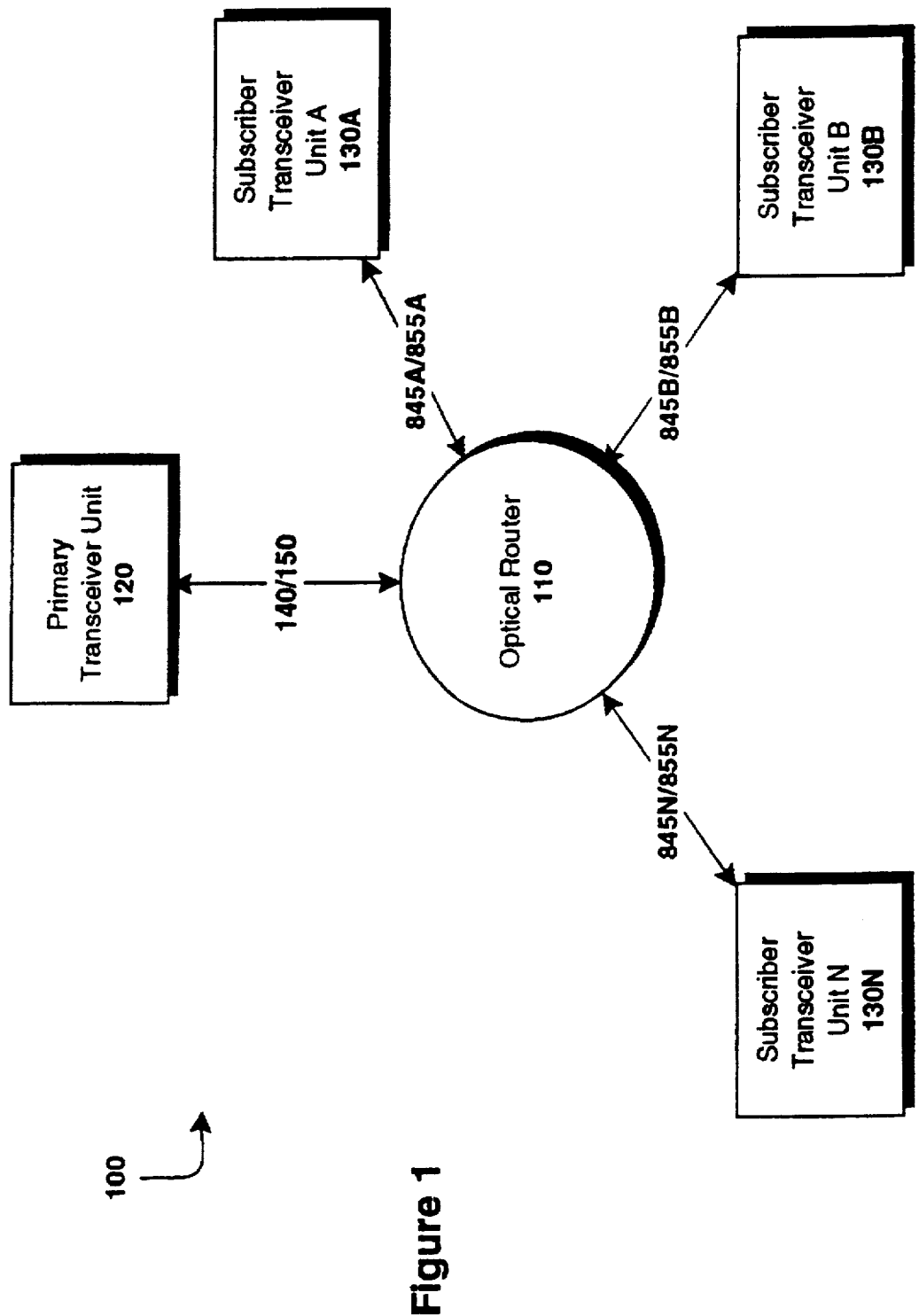
FIG. 1 illustrates a point-to-multipoint wide area telecommunications network using atmospheric laser transmission according to the preferred embodiment of the present invention.

Referring now to FIG. 1, a point-to-multipoint wide area telecommunications network 100 using atmospheric light beam or laser transmission according to the preferred embodiment of the present invention is shown. The network 100 preferably comprises a primary transceiver unit 120, an optical router 110 and a plurality of subscriber transceiver units 130–130N (referred to collectively as 130). In an alternate embodiment, the network 100 comprises only the optical router 110 and the plurality of subscriber transceiver units. The present invention provides a broadband bi-directional communication network with reduced infrastructure costs, i.e., no cable or fiber is required to be laid in the subscriber loop, i.e., to the subscribers.

According to the preferred embodiment of the present invention the subscriber transceiver units are located at subscriber premises, such as homes or businesses. The optical router 110 is located amidst or nearby the subscriber transceiver units 130, and the optical router optically communicates with the subscriber units 130. The optical router 110 has an associated range of accessibility, wherein the optical router 110 is capable of communicating with subscriber transceiver units located within a circular area around the optical router 110. In the preferred embodiment, the range of accessibility is approximately between 2000 and 4000 feet. It is contemplated, however, that larger or smaller ranges of accessibility of the optical router 110 may be employed in the network of the present invention. Each of the subscriber transceiver units 130 is positioned in a line of sight path relative to the optical router 110.

The optical router 110 is positioned in a line of sight path relative to the primary transceiver unit 120. The optical router 110 is preferably mounted on, for example, a pole, building, or other structure approximately 75 feet above ground level. Preferably the distance between the primary transceiver unit 120 and the optical router 110 is approximately between one half and ten miles. It is contemplated, however, that larger or smaller distances may exist between the optical router 110 and the primary transceiver unit 120 in the network of the present invention.

The primary transceiver unit 120 generates a first light beam 140 and atmospherically transmits the first light beam 140 to the optical router 110. Alternatively, the primary transceiver unit 120 receives the first light beam 140 from another transceiver (not shown) and provides or directs the first light beam 140 to the optical router 110. In the preferred embodiment, the term "light beam" is intended to encompass any of various types of light transmission, including lasers, a super-fluorescent light source, or other coherent and/or non-coherent light or optical transmission.

The primary transceiver unit 120 modulates data on the first light beam 140 before transmitting the first light beam 140 to the optical router 110. Data may be modulated on the first light beam using any of various techniques, including time and/or frequency techniques, as is well known in the art.

The optical router 110 atmospherically receives the first light beam 140 including the data sent by the primary transceiver unit 120 and demodulates the data, then modulates the data on and atmospherically transmits a second light beam 845A–845N (referred to collectively as 845) to the subscriber transceiver units 130. The second light beam 845 contains at least a portion of the data sent by the primary transceiver unit 120. The subscriber transceiver units 130 atmospherically receive the second light beam 845 and demodulate the data sent by the primary transceiver unit 120 from the second light beam 845. The present invention distinguishes among different users, i.e., shares the communication bandwidth, using techniques such as time division multiple access (TDMA) or frequency division multiple access (FDMA). The present invention may also use code division multiple access (CDMA) techniques.

The subscriber transceiver units 130 atmospherically transmit a third light beam 855A–855N (referred to collectively as 855) to the optical router 110. The subscriber transceiver units 130 modulate data on the third light beam 855 and then transmit the third light beam 855 to the optical router 110. The optical router 110 atmospherically receives the third light beam 855 including the data sent by the subscriber transceiver units 130 and demodulates the data, then modulates the data on and atmospherically transmits a fourth light beam 150 to the primary transceiver unit 120. The primary transceiver unit 120 receives the fourth light beam 150 and demodulates the data sent by the subscriber transceiver units 130 from the fourth light beam 150. Alternatively, the optical router 110 and/or the primary transceiver unit 120 provide the fourth light beam 150 to another transceiver (not shown) for demodulation, wherein this other transceiver is in communication with the primary transceiver unit 120.

The optical router 110 routes data between the primary transceiver unit 120 and each of the subscriber transceiver units 130 thus establishing channels of communication, that is, subscriber channels, on the light beams between the primary transceiver unit 120 and the subscriber transceiver units 130. Preferably the optical router 110 establishes subscriber channels in a time-multiplexed fashion. During a first time period the optical router 110 establishes a first set of one or more subscriber channels between the primary transceiver unit 120 and a first set of one or more subscriber transceiver units 130. Next, the optical router 110 establishes a second set of subscriber channels between the primary transceiver unit 120 and a second set of subscriber transceiver units 130 during a second time period. The optical router 110 proceeds in this manner, establishing a two-way or bi-directional subscriber channel with each of the subscriber transceiver units 130 in the range of accessibility of the optical router 110.

One embodiment of the present invention contemplates any or all of the first light beam 140, second light beam 845, third light beam 855, and fourth light beam 150, comprising a plurality of different wavelengths, wherein data is modulated on each wavelength of the light beams, thereby advantageously increasing the bandwidth of the subscriber channels.

The network of the present invention may support a large number of subscribers. One embodiment contemplates on the order of 1000 subscriber transceiver units supported by a single optical router.

Thus it may be readily observed that by proceeding in the previously described manners the recited elements form a wireless point-to-multipoint wide area telecommunications network. By establishing subscriber communications channels in a multiplexed manner using atmospherically transmitted light beams, the present invention advantageously provides a telecommunications network which has the potential to be much less expensive than current solutions such as copper wire or fiber optic communications networks.

Additionally, the present invention advantageously provides a much less expensive telecommunications network than a network which employs an array of point-to-point atmospherically transmitted light beams.

Further, by employing light beams as the communications path, the present invention advantageously avoids competing for expensive electromagnetic broadcast bands of mobile telecommunications systems.

Finally, the present invention advantageously provides a communications network which consumes much less power than a system which employs an angularly dispersed light beam.

In the preferred embodiment of the present invention, the primary transceiver unit 120 communicates control information to the optical router 110 and subscriber transceiver units 130. The control information for the optical router 110 contains information about the angular location of the subscriber transceiver units 130. The control information also contains timing information to instruct the optical router 110 regarding multiplexing of the light beams and thus establishing the subscriber communications channels. The control information for the subscriber transceiver units 130 contains timing information instructing the subscriber transceiver units 130 about when to transmit the third light beam 855 to the optical router 110. The primary transceiver unit 120 transmits the first light beam 140 and receives the fourth light beam 150 cooperatively according to the control information which the primary transceiver unit 120 communicates to the optical router 110 and subscriber transceiver units 130.

In the preferred embodiment of the network, the primary transceiver unit 120 includes a master clock and computes timing control information based upon at least a plurality of the following factors: the data packet size, the local speed of light, the number of subscribers, the distance between the primary transceiver unit and the optical router, the distance between the optical router and the respective subscriber transceiver unit, the processing time of the subscriber transceiver units, the time associated with the electronic router (discussed below), and the switching speed of the X–Y beam deflectors (discussed below).

In the preferred embodiment of the present invention the first light beam 140 and the fourth light beam 150 are substantially collinear as are the second light beam 845 and third light beam 855. The collinear light beam embodiment advantageously allows many of the optical components of the primary transceiver unit, optical router and subscriber transceiver units to be shared by the light beams. In this embodiment, the first light beam 140 and the fourth light beam 150 have different frequencies or polarities as do the second light beam 845 and third light beam 855 to advantageously avoid cross-talk between the two light beams. In an alternate embodiment, the first light beam 140 and fourth light beam 150 are in close proximity but not collinear as are the second light beam 845 and third light beam 855.

Figure 2:
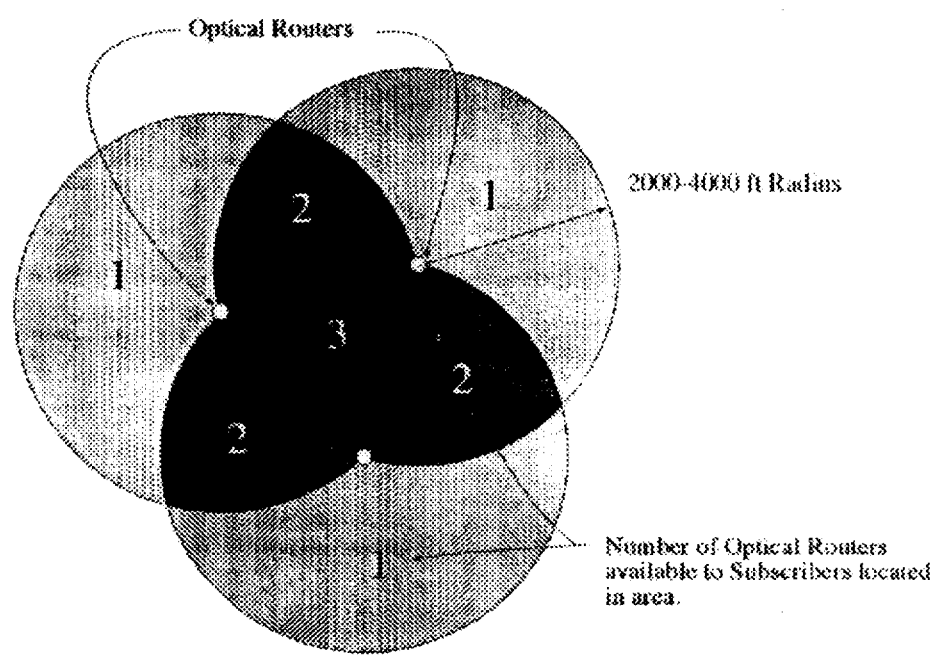
FIG. 2 illustrates the overlapping coverage achieved by the incorporation of multiple optical routers in the network of FIG. 1.

Referring now to FIG. 2, a network comprising a plurality of optical routers is shown. Each optical router has an associated range of accessibility. In one embodiment of the present invention, the optical routers are spatially located such that the accessibility ranges of some of the optical routers overlap. That is, more than one optical router is able to service a given subscriber. FIG. 2 shows various regions of coverage and indicates the number of optical routers which may service a subscriber located in the region.

In one embodiment of the present invention, if a subscriber transceiver unit detects a loss of reception of the first light beam, the subscriber transceiver unit searches for another optical router by which to receive service. By providing overlapping coverage of a given subscriber by multiple optical routers, the present invention advantageously provides an element of redundancy and hence more reliable operation.

In FIG. 2, three optical routers are shown. However, the present invention is not limited in the number of optical routers which may be serviced by a given primary transceiver unit 120, nor the number of optical routers which may service a given subscriber transceiver unit 130.

In one embodiment of the present invention the primary transceiver unit 120 comprises a plurality of light sources to generate a plurality of first light beams to transmit to a plurality of optical routers. In another embodiment of the present invention the primary transceiver unit 120 comprises a single light source to generate a single light beam, and the primary transceiver unit 120 is configured to split the light beam generated by the single light source into multiple first light beams transmitted to a plurality of optical routers. In both embodiments the primary transceiver unit 120 modulates subscriber data on each first light beam.

Alternate Embodiments

Figure 3:
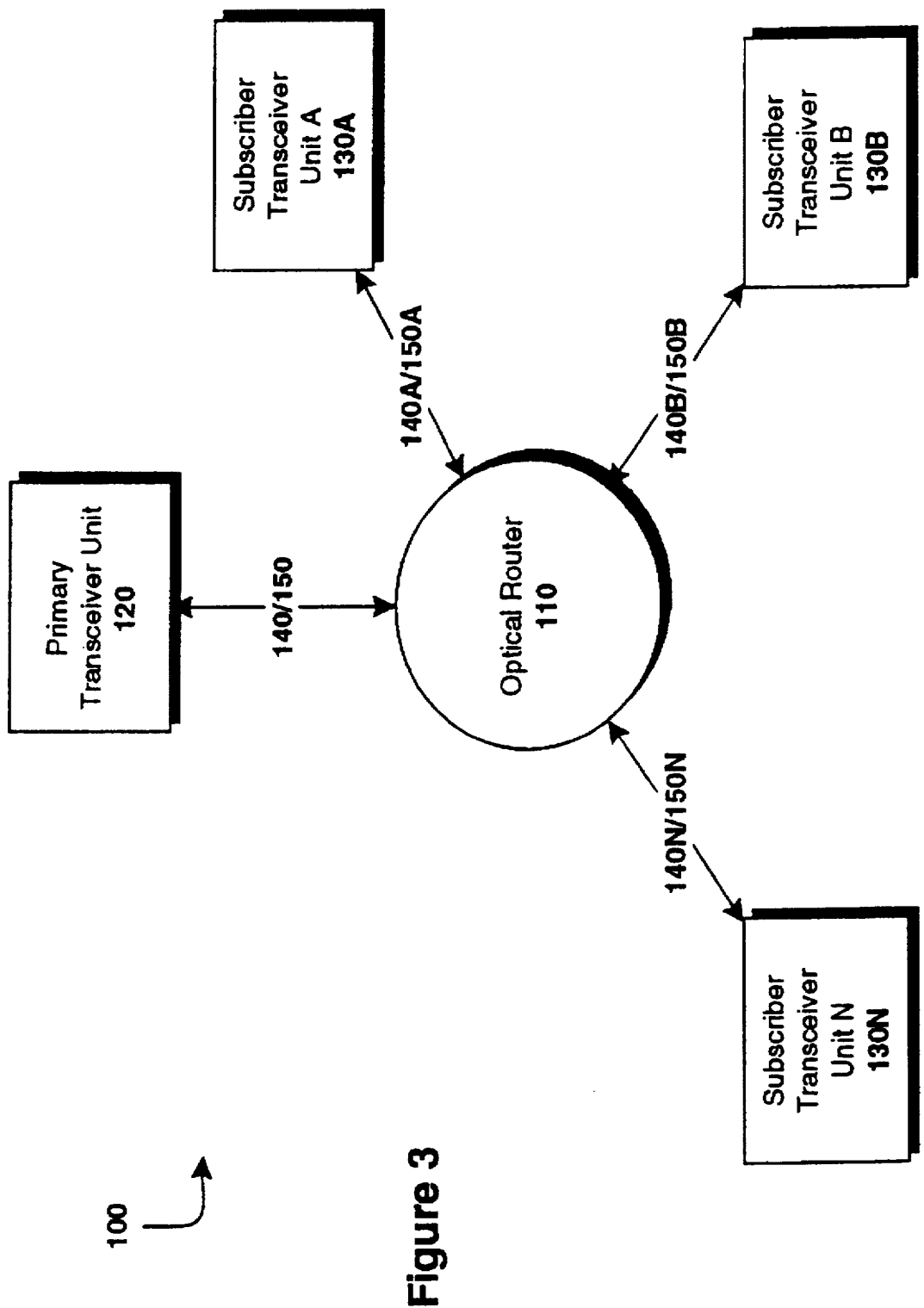
FIG. 3 illustrates a point-to-multipoint wide area telecommunications network using atmospheric laser transmission according to an alternate embodiment of the present invention.

Referring now to FIG. 3, an alternate embodiment of the network 100 of FIG. 1 is shown. The embodiment of FIG. 3 is similar to the embodiment of FIG. 1, and corresponding elements are numbered identically for simplicity and clarity. The optical router 110 of FIG. 3 corresponds to the alternate embodiment of the optical router 110 shown in FIG. 7 and described below. In the alternate embodiment the optical router redirects the light beam from the primary transceiver unit 120 to the subscriber transceiver units 130 and redirects the light beams from the subscriber transceiver units 130 to the primary transceiver unit 120 rather than demodulating the data and remodulating it. The optical router 110 receives the first light beam 140 and redirects the first light beam 140 to the subscriber transceiver units 130. The subscriber transceiver units 130 receive the first light beam 140 and demodulate the data sent by the primary transceiver unit 120 from the first light beam 140. The present invention distinguishes among different users, i.e., shares the communication bandwidth, using techniques such as time division multiple access (TDMA) or frequency division multiple access (FDMA). The present invention may also use code division multiple access (CDMA) techniques.

The subscriber transceiver units 130 atmospherically transmit a second light beam 150A–150N (referred to collectively as 150) to the optical router 110. The subscriber transceiver units 130 modulate data on the second light beam 150 and then transmit the second light beam 150 to the optical router 110. The optical router 110 receives the second light beam 150 and redirects the second light beam 150 to the primary transceiver unit 120. The primary transceiver unit 120 receives the second light beam 150 and demodulates the data sent by the subscriber transceiver units 130 from the second light beam 150. Alternatively, the optical router 110 and/or the primary transceiver unit 120 provide the second light beam 150 to another transceiver (not shown) for demodulation, wherein this other transceiver is in communication with the primary transceiver unit 120.

The optical router 110 redirects the first and second light beams between the primary transceiver unit 120 and each of the subscriber transceiver units 130 during different time periods, that is, in a time-multiplexed manner. In other words, the optical router 110 establishes channels of communication comprising the light beams between the primary transceiver unit 120 and the subscriber transceiver units 130 in distinct time slices. Thus, during a first time period the optical router 110 establishes a first subscriber channel by redirecting the first light beam 140 from the primary transceiver unit 120 to a first subscriber transceiver unit 130 and redirecting the second light beam 150 from the first subscriber transceiver unit 130 to the primary transceiver unit 120. Next, the optical router 110 establishes a second subscriber channel between the primary transceiver unit 120 and a second subscriber transceiver unit 130 during a second time period. The optical router 110 proceeds in this manner, establishing a two-way or bi-directional subscriber channel with each of the subscriber transceiver units 130 in the range of accessibility of the optical router 110.

The alternate embodiment of the network 100 contemplates an alternate multiplexing manner wherein the primary transceiver unit 120 is configured to generate and/or transmit a first light beam 140 which comprises a plurality of different wavelengths which correspond to the subscribers. The optical router 110 receives the light beam and provides each of the wavelength portions to the respective subscribers. In this embodiment, the optical router 110 includes a grating, such as a diffraction grating, which separates the different frequency or spectra and provides the different wavelength portions to the respective subscribers. Additionally, each subscriber transceiver unit is configured to generate a second light beam of one or more respective unique wavelengths. The optical router 110 redirects the respective wavelength light beams of the first and second light beams between the primary transceiver unit 120 and respective subscriber transceiver units 130, that is, in a frequency-multiplexed manner. Alternately stated, the optical router 110 establishes subscriber channels of communication on the light beams between the primary transceiver unit 120 and the subscriber transceiver units 130 based upon different wavelength portions of a light beam. Thus, the optical router 110 establishes a first subscriber channel by redirecting a first wavelength portion of the first light beam from the primary transceiver unit 120 to a first subscriber transceiver unit 130 and redirecting the second light beam 150 comprising the first wavelength from the first subscriber transceiver unit 130 to the primary transceiver unit 120. Simultaneously, the optical router 110 establishes a second subscriber channel between the primary transceiver unit 120 and a second subscriber transceiver unit 130 using a second wavelength portion of the first light beam 140 and a second light beam 150 comprising the second wavelength. The optical router 110 operates in this manner, establishing a subscriber channel with subscriber transceiver units 130 in the range of accessibility of the optical router 110. By employing multiple wavelength light beams and FDMA techniques, the invention advantageously increases the bandwidth available to the subscribers.

Another alternate multiplexing embodiment is contemplated in which the optical router 110 establishes subscriber communication channels in a combined time-multiplexed and frequency-multiplexed manner. A subscriber requiring increased data bandwidth employs a subscriber transceiver unit configured to receive multiple light beams of differing wavelengths thereby multiplying the bandwidth available to the subscriber. In another embodiment, the present invention employs code division multiple access (CDMA) techniques using bipolar codes.

The present invention contemplates an alternate embodiment of the network 100 comprising unidirectional data transmission, that is, broadcast or point-to-multipoint data communication only from the primary transceiver unit 120 and/or optical router 110 to the subscriber transceiver units 130. In this embodiment, the subscriber transceiver units 130 do not generate light beams back through the optical router 110 to the primary transceiver unit 120. Other aspects of this alternate embodiment are as described above in the preferred embodiment of FIG. 1 and the alternate embodiment of FIG. 3. This alternate embodiment is contemplated as an advantageous alternative to current implementations of broadcast television, particularly high definition television, or cable television, for example. Thus this embodiment may comprise a pure broadcast (one-way) network. Alternatively, the network 100 may use a different return path from the subscriber units 130 to the primary transceiver unit 120, such as an analog modem (POTS) or ISDN.

The present invention further contemplates an alternate embodiment of the network in which the primary transceiver unit 120 essentially resides in the same location as the optical router 110. Alternately stated, the primary transceiver unit 120 and the optical router 110 are essentially combined into a single unit. In this embodiment the light source of the primary transceiver unit 120 transmits only a few inches or feet into the optical router 110. Various elements of the primary transceiver unit 120 and optical router 110 may be eliminated or combined in such an embodiment. In this embodiment, fiber optic cable may be used to transfer the light beam directly to the optical router 110, and thus a separate primary transceiver unit 120 is not needed.

The Optical Router

Figure 4:
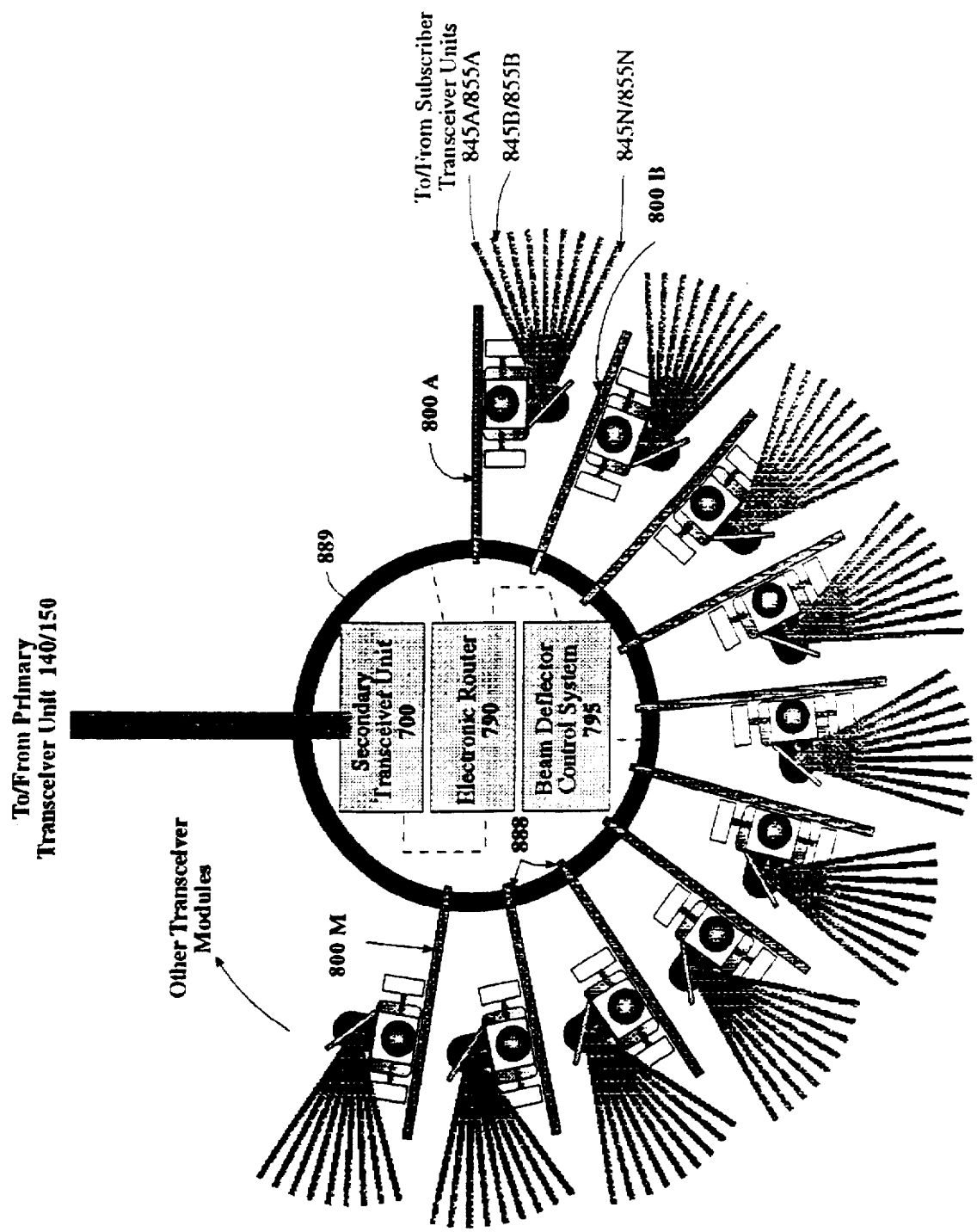
FIG. 4 illustrates the preferred embodiment of the optical router in the network of FIG. 1.

Referring now to FIG. 4, the preferred embodiment of the optical router 110 in the network 100 (of FIG. 1) is shown. The optical router 110 comprises a secondary transceiver unit 700 coupled to a plurality of transceiver modules 800A–800M (referred to collectively as 800) by an electronic router 790. The transceiver modules 800 are coupled to a circular backplane 889. The electronic router 790 is coupled to the transceiver modules 800 through the backplane 889.

Transceiver module 800A (representative of the transceiver modules 800) has a backplane connector 888 which connects the transceiver module 800A to the backplane. The transceiver module 800A is configured to transmit the second light beam 845 to and receive the third light beam 855 from a portion of the subscriber transceiver units 130, namely those subscriber transceiver units 130 within a portion of the circular area around the optical router 110. The transceiver modules 800 collectively provide the optical router 110 with a 360 degree range of accessibility to the subscriber transceiver units 130.

A beam deflector control system 795 is coupled through the backplane 889 to the transceiver modules 800 for controlling the deflection of the second light beam 845 and third light beam 855 by the transceiver modules 800. The beam deflector control system 795 is also coupled to the electronic router 790 and receives beam deflector control information from the primary transceiver unit 120 through the electronic router 790.

The electronic router 790 receives routing control information from the primary transceiver unit 120. The routing control information regards the routing of data sent by the primary transceiver unit 120 from the secondary transceiver unit 700 to the various transceiver modules 800 for atmospheric transmission to the subscriber transceiver units 130. Conversely, the routing control information regards the routing of data sent by the subscriber transceiver units 130 from the various transceiver modules 800 to the secondary transceiver unit 700 for atmospheric transmission to the primary transceiver unit 120.

The secondary transceiver unit 700 atmospherically receives the first light beam 140 including the data sent by the primary transceiver unit 120 and demodulates the data. The secondary transceiver unit 700 communicates the data sent by the primary transceiver unit 120 to the electronic router 790. The electronic router 790 routes the data from the secondary transceiver unit 700 to the appropriate one of the transceiver modules 800. For illustration purposes let us assume transceiver module 800A is the appropriate transceiver module 800. The transceiver module 800A receives the data and modulates the data onto the second light beam 845 which is atmospherically transmitted to the appropriate subscriber transceiver unit 130A.

Conversely, the transceiver module 800A receives the third light beam 855 including data from the subscriber transceiver unit 130 and demodulates the data. The transceiver module 800A communicates the data sent by the subscriber transceiver unit 130A to the electronic router 790. The electronic router 790 routes the data from the transceiver module 800A to the secondary transceiver unit 700. The secondary transceiver unit 700 modulates the data sent by the subscriber transceiver unit 130A onto the fourth light beam 150 and atmospherically transmits the fourth light beam 150 including the data sent by the subscriber transceiver unit 130A to the primary transceiver unit 120.

FIG. 5

Figure 5:
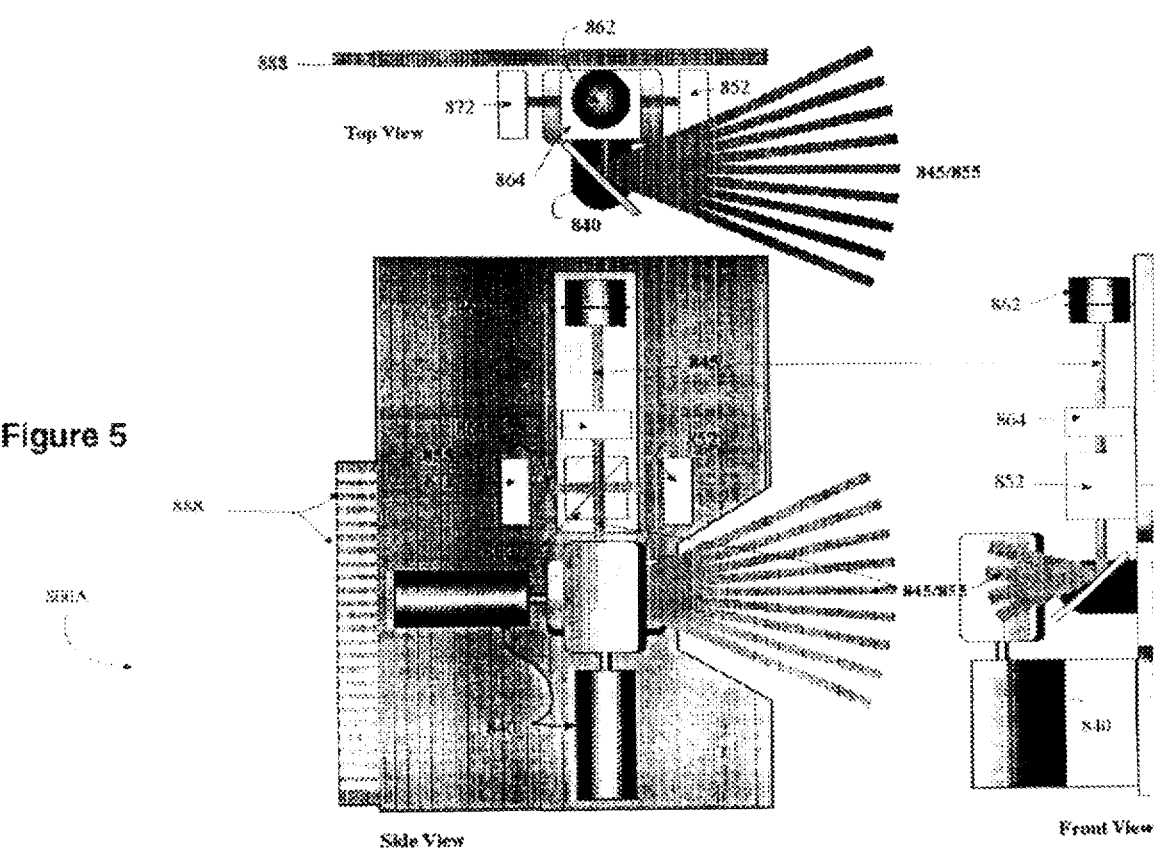
FIG. 5 is a plan view of a transceiver module of FIG. 4.

Referring now to FIG. 5, a plan view of the transceiver module 800A of the optical router 110 of FIG. 4 is shown. The transceiver module 800A comprises a light source 862 configured to generate the second light beam 845. A beam modulator 864 receives data which was sent by the primary transceiver unit 120 from the electronic router 790 through the backplane connector 888 and modulates the data onto the second light beam 845. The second light beam 845 is deflected by an X–Y beam deflector 840 to the subscriber transceiver unit 130A.

Preferably the X–Y beam deflector 840 is a galvanometer mirror pair. Galvanometer mirrors are well known, particularly in the art of laser printer technology and the art of laser light shows. Alternatively the X–Y beam deflector 840 is an acousto-optic or solid state beam deflector. The optical router 110 light source 862 preferably comprises one or more continuous wave or pulsed beam lasers as are well known in the art, such as gas, solid state or diode lasers. The beam modulator 864 preferably comprises an electro-optic cell. Alternatively, the beam modulator 864 is a bulk type modulator. The light source and beam modulator configuration is indicative of those well known in fiber optic communication link transmission systems. However, the laser power output is typically significantly greater than those used in fiber optic systems.

While the X–Y beam deflector 840 deflects the second light beam 845 to the subscriber transceiver unit 130A the X–Y beam deflector 840 simultaneously deflects the third light beam 855 from the subscriber transceiver unit 130A to a beam splitter 880. The beam splitter 880 splits a relatively large portion of the third light beam 855 to a beam demodulator 872 which receives the third light beam 855 and demodulates data sent by the subscriber transceiver unit 130A from the third light beam 855. The beam demodulator 872 communicates the data through the backplane connector 888 to the electronic router 790. The beam demodulator 872 preferably comprises a photo-diode as is common in the art.

During a first time period, the X–Y beam deflector 840 deflects the second light beam 845 from the light source 862 to a first subscriber transceiver unit 130A and deflects the third light beam 855 from the first subscriber transceiver unit 130A to the beam demodulator 872. Hence, the transceiver module 800A establishes a bi-directional communications channel using the second and third light beams between the transceiver module 800A and the first subscriber transceiver unit 130A for a first period of time.

Hence, the bi-directional communications channel between the transceiver module 800A and the first subscriber transceiver unit 130A comprises a portion of the subscriber channel described above between the primary transceiver unit 120 and the subscriber transceiver unit 130A. During subsequent periods of time the X-Y beam deflector 840 deflects the second and third light beams to and from other subscriber transceiver units 130 in a time-multiplexed manner.

Each of the transceiver modules 800 establishes bi-directional communication channels as just described between the given transceiver module and the portion of the subscriber transceiver units 130 accessible by the given transceiver module in a time-multiplexed fashion and simultaneously with the other transceiver modules. In this manner, a portion of a wireless point-to-multipoint bidirectional wide area telecommunications network is advantageously formed between the optical router 110 and the subscriber transceiver units 130.

The beam splitter 880 splits a relatively small portion of the third light beam 855 to a beam alignment detector 852 which receives the split portion of the third light beam 855 and detects misalignment or wander of the third light beam 855 from the subscriber transceiver unit 130A which may occur and stores the beam stabilization information. The beam alignment detector 852 communicates the beam stabilization information through the backplane 888 via the electronic router 790 to the secondary transceiver unit 700. The secondary transceiver unit 700 transmits the beam stabilization information to the primary transceiver unit 120. The primary transceiver unit 120 communicates the beam stabilization information to the given subscriber transceiver unit so that the subscriber transceiver unit can adjust the beam for misalignment or wander appropriately. Atmospheric turbulence and density variations along the atmospheric path between the subscriber transceiver unit 130A and the optical router 110 may account for misalignment of the third light beam 855 on the X-Y beam deflector 840 of the transceiver module 800A. Likewise, events such as ground shifting or tower sway may cause the positions of the subscriber transceiver unit 130A or optical router 110 relative to each other to change.

FIG. 6

Figure 6:
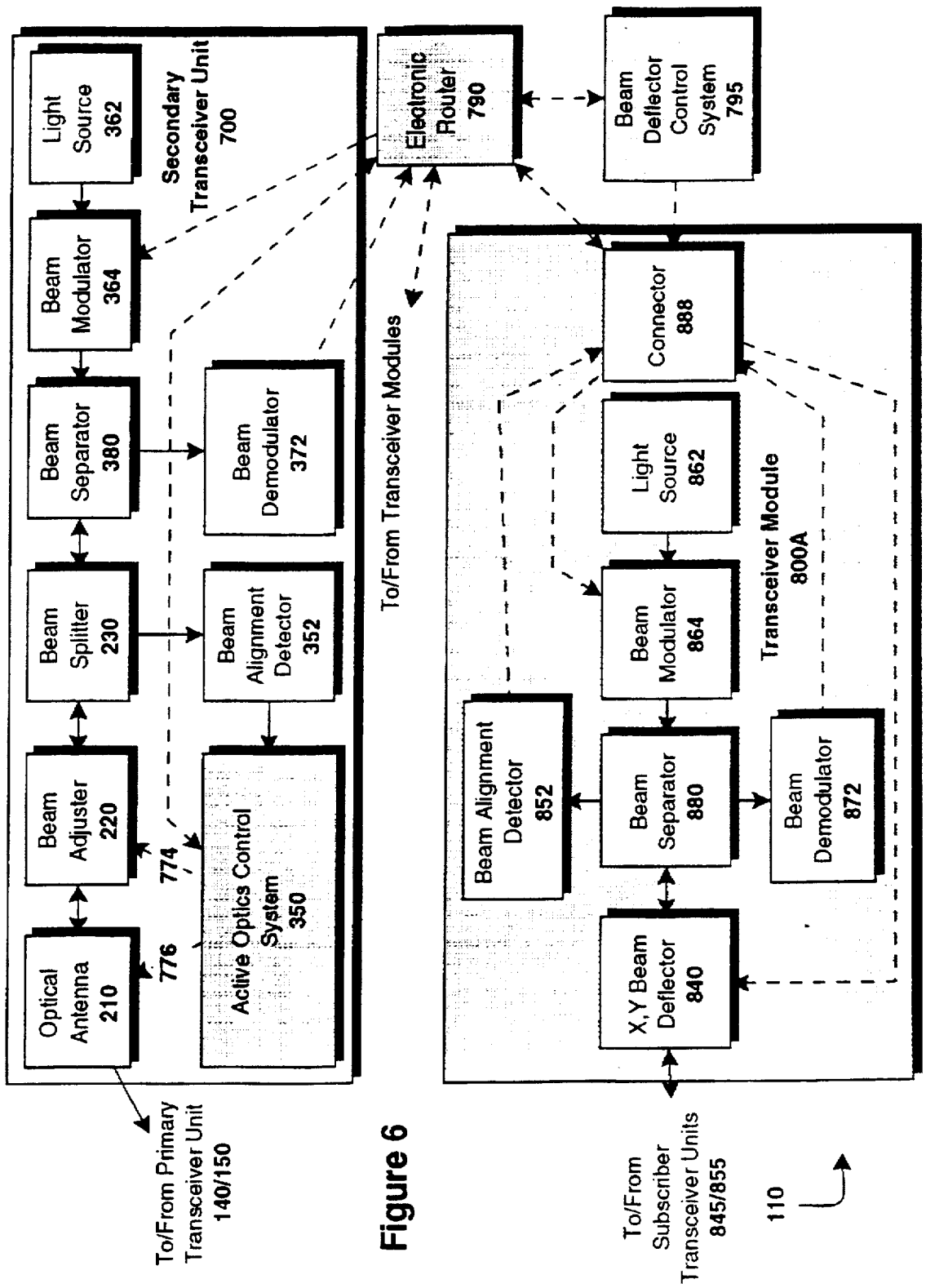
FIG. 6 is a block diagram of the optical router of FIG. 4, including a detailed block diagram of the secondary transceiver unit.

Referring now to FIG. 6, a block diagram of the optical router 110 of FIG. 4 is shown including a detailed block diagram of the secondary transceiver unit 700. A transceiver module 800A is coupled to the electronic router 790 through the backplane 889. The electronic router 790 is also coupled to the other transceiver modules 800 (not shown). The electronic router 790 is coupled to the beam deflector control system 795 and to the secondary transceiver unit 700.

The secondary transceiver unit 700 comprises an optical antenna 210 which receives the first light beam 140 from the primary transceiver unit 120. The optical antenna 210 also transmits the fourth light beam 150 to the primary transceiver unit 120. The optical antenna 210 preferably comprises an optical system with a conic mirror, which is well known in the art. Alternatively the optical antenna 210 is a collecting lens system which is also well known in the art. The optical antenna 210 and associated optics converge and re-collimate the incoming first light beam 140 to a relatively small diameter, preferably in the range of 1 to 3 millimeters. Conversely, the optical antenna 210 receives a relatively small diameter fourth light beam 150 generated by a light source 362 and expands and re-collimates the fourth light beam 150 for atmospheric transmission to the primary transceiver unit 120.

The optical antenna 210 atmospherically receives the first light beam 140 including the data sent by the primary transceiver unit 120 (of FIG. 1) from the primary transceiver unit 120 and directs the first light beam 140 to a beam demodulator 372. The beam demodulator 372 demodulates the data sent by the primary transceiver unit 120 from the first light beam 140 and communicates the data to the electronic router 790. The data sent by the primary transceiver unit 120 comprises subscriber data as well as control data. The control data comprises routing control information for the electronic router 790 as well as timing control information and angular position control information of the subscriber transceiver units 130 for the beam deflector control system 795. The electronic router 790 uses the routing control information to route the subscriber data to the appropriate transceiver modules 800. The electronic router 790 communicates the timing control information and the angular position control information to the beam deflector control system 795. The beam demodulator 372 preferably comprises a photodiode as is common in the art.

The light source 362 generates the fourth light beam 150. The electronic router 790 routes the data sent by the subscriber transceiver units 130 from the transceiver modules 800 to a beam modulator 364. The beam modulator 364 modulates the data sent by the subscriber transceiver units 130 onto the fourth light beam 150 for transmission to the optical antenna 210 and on to the primary transceiver unit 120.

The light source 362 preferably comprises one or more continuous wave or pulsed beam lasers as are well known in the art, such as gas, solid state or diode lasers. The beam modulator 364 preferably comprises an electro-optic cell. Alternatively, the beam modulator 364 is a bulk type modulator. The light source and beam modulator configuration is indicative of those well known in fiber optic communication link transmission systems. However, the laser power output is typically significantly greater than those used in fiber optic systems.

As the first light beam 140 passes from the optical antenna 210 to the beam demodulator 372 the first light beam 140 is directed toward the beam demodulator 372 by a beam separator 380. Conversely, as the fourth light beam 150 passes from the light source 362 to the optical antenna 210 the fourth light beam 150 passes through the beam separator 380.

The X-Y beam deflector 840 is coupled through the backplane 889 to the beam deflector control system 795. The beam deflector control system 795 controls the switching of the X-Y beam deflector 840 to deflect the second light beam 845 and third light beam 855 to and from the desired subscriber transceiver unit 130 at the desired time. Thus in a time-multiplexed fashion the beam deflector control system controls the establishing of the portion of the subscriber channels between the subscriber transceiver units 130 and the transceiver modules 800.

Preferably, the beam deflector control system 795 receives control information from the primary transceiver unit 120 to control the X-Y beam deflector 840. The control information for the beam deflector control system 795 contains information about the angular location of the subscriber transceiver units 130. The beam deflector control system 795 uses the subscriber transceiver unit angular location information to determine the desired deflection angles of the X-Y beam deflector 840.

As mentioned in the discussion of FIG. 1, the primary transceiver unit 120 also preferably transmits multiplexing control information to the optical router 110 and to the subscriber transceiver units 130. The primary transceiver unit 120 transmits the control information for one or more subscriber channels prior to transmitting the subscriber data packets associated with the one or more subscriber channels. The multiplexing information is timing information used by the beam deflector control system 795 to control the X-Y beam deflector 840 regarding when to deflect the second and third light beams to and from a given subscriber transceiver unit 130.

The subscriber transceiver unit transmits the third light beam 855 containing data for the primary transceiver unit 120 to the optical router 110 at a time determined by the primary transceiver unit 120. Correspondingly, the transceiver module servicing the subscriber transceiver unit transmits the second light beam with the data modulated for the subscriber transceiver unit to arrive at the X-Y beam deflector at substantially the same time as the third light beam 855 containing data from the first subscriber arrives at the optical router 110. The primary transceiver unit 120 transmits the first light beam 140 containing data for the subscriber transceiver unit to arrive at the optical router 110 at a time such that the data may be demodulated, routed, modulated on the second light beam 845 and the second light beam 845 transmitted to arrive at the X-Y beam deflector 840 at substantially the same time as the third light beam 855 containing data from the first subscriber arrives at the optical router 110.

By employing optical components to converge and re-collimate the light beams as described previously, the internal components of the optical router 110, such as the beam deflector, advantageously operate on relatively narrow light beams. This improves the accuracy of beam redirection. Conversely, by employing optical components to expand and re-collimate the light beams as described previously, the light beams traveling through the atmosphere between network elements are advantageously relatively wide light beams. This improves the reception characteristics of the light beams as they are received by the network components.

The optical router 110 further comprises an active optics control system 350, such as are well known, particularly in the defense industry. The active optics control system 350 provides stabilization of the first light beam 140 on the optical antenna 210 of the optical router 110 and of the fourth light beam 150 on the optical antenna 710 (of FIG. 8) of the primary transceiver unit 120. As the first light beam 140 travels from the optical antenna 210 toward the beam demodulator 372, a small portion of the first light beam 140 is split by a beam separator 380 and redirected to a beam alignment detector 352. The beam alignment detector 352 detects misalignment or wander in the first light beam 140 which may occur and stores the beam stabilization information. Atmospheric turbulence and density variations along the atmospheric path between the primary transceiver unit 120 and the optical router 110 may account for misalignment of the first light beam 140 on the optical router 110. Likewise, events such as ground shifting or tower sway may cause the positions of the primary transceiver unit 120 or optical router 110 relative to each other to change.

The active optics control system 350 communicates the beam stabilization information to the electronic router 790 which in turn communicates the beam stabilization information to the beam modulator 364. The beam modulator 364 modulates the beam stabilization information data onto the fourth light beam 150 during a designated time period for atmospheric transmission to the primary transceiver unit 120. The primary transceiver unit 120 demodulates the beam stabilization information data from the fourth light beam 150 and uses the beam stabilization information to make corrections and stabilize the first light beam 140 on the optical router 110.

Additionally, the active optics control system 350 uses the beam misalignment information to control a beam adjuster 220, positioned between the optical antenna 210 and the beam splitter 230, to adjust the first light beam 140 optimally into the beam demodulator 372.

As previously mentioned the primary transceiver unit 120 communicates control information to the optical router 110. The control information further comprises beam stabilization information. The active optics control system 350 uses the beam stabilization information from the primary transceiver unit 120 to control the optical antenna 210 and beam adjuster 220 to make corrections and stabilize the fourth light beam 150 on the primary transceiver unit 120.

Preferably the beam separator 380 is a dichroic mirror. Alternatively, the first light beam 140 and fourth light beam 150 are orthogonally polarized and the beam separator 380 is a polarization separator.

In the preferred embodiment of the invention, the optical router 110 periodically polls the subscriber transceiver units 130 by allocating a communication channel to each of the subscriber transceiver units 130 within the range of accessibility of the optical router 110. However, the optical router 110 may lose reception of the third light beam 855 from a given subscriber transceiver unit for a significant period of time. The most common cause of the reception loss is the subscriber transceiver unit being powered off. When the optical router 110 detects reception loss, the optical router 110 preferably and advantageously polls the powered-off subscriber less frequently than subscriber transceiver units which are actively transmitting a third light beam 855 to the optical router 110.

Alternate Embodiment

Figure 7:
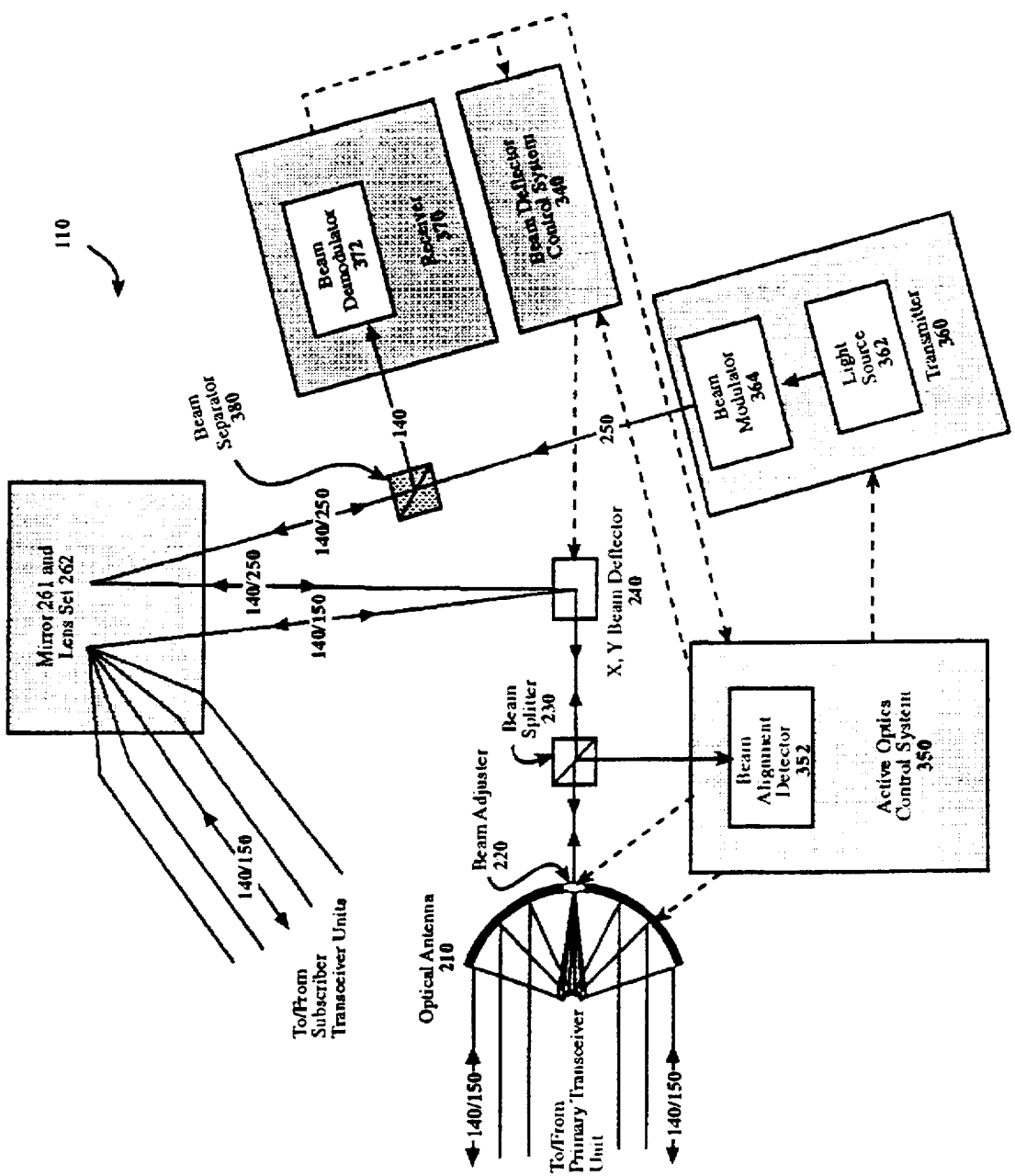
FIG. 7 illustrates the optical router in the network of FIG. 3.

Referring now to FIG. 7, an alternate embodiment of the optical router 110 in the network 100 (of FIG. 3) is shown. The optical router 110 comprises an optical antenna 210 which receives the first light beam 140 from the primary transceiver unit 120. The optical antenna 210 also transmits the second light beam 150 received from a subscriber transceiver unit to the primary transceiver unit 120. The optical antenna 210 preferably comprises an optical system with a conic mirror, which is well known in the art. In an alternate embodiment the optical antenna 210 is a collecting lens system which is also well known in the art. The optical antenna 210 and associated optics converge and re-collimate the incoming first light beam 140 to a relatively small diameter, preferably in the range of 1 to 3 millimeters. Conversely, the optical antenna 210 receives a relatively small diameter second light beam 150 received from internal components of the optical router 11 and expands and re-collimates the second light beam 150 for atmospheric transmission to the primary transceiver unit 120.

The optical antenna 210 receives the first light beam 140 from the primary transceiver unit 120 (of FIG. 3) and directs the first light beam 140 to an X-Y beam deflector 240. The beam deflector 240 receives the first light beam 140 and deflects the first light beam 140 toward a mirror 261. The mirror 261 reflects the first light beam 140 to a respective one or more of the subscriber transceiver units 130 (of FIG. 3). Conversely, the subscriber transceiver units 130 transmit respective second light beams 150 to the mirror 261. The mirror 261 reflects a received second light beam 150 to the beam deflector 240. The beam deflector 240 deflects the second light beam 150 to the optical antenna 210. The optical antenna 210 receives the second light beam 150 and transmits the second light beam 150 to the primary transceiver unit 120.

Preferably, during a first time period, the beam deflector 240 deflects the first light beam 140 from the optical antenna 210 to a location on the mirror 261 and deflects the second light beam 150 from substantially the same location on the mirror to the optical antenna 210. The location on the mirror 261 is calculated to reflect the first light beam 140 to a particular subscriber transceiver unit and reflect the second light beam 150 from the particular subscriber transceiver unit. Hence, the optical router 110 establishes a bidirectional communications channel using the first and second light beams between the primary transceiver unit 120 and one of the subscriber transceiver units 130 for a period of time. During subsequent periods of time the beam deflector 240 deflects the light beams to other locations on the mirror 261 in order to establish channels with the other subscriber transceiver units 130 serviced by the optical router 110. In this manner, a wireless point-to-multipoint bidirectional wide area telecommunications network is advantageously formed.

The beam deflector 240 is controlled by a beam deflector control system 340 coupled to the beam deflector 240. The beam deflector control system 340 controls the beam deflector 240 to deflect the light beams to the desired locations on the mirror 261 during the desired time. Preferably, the beam deflector control system 340 receives control information from the primary transceiver unit 120 to control the beam deflector 240. The control information for the optical router 110 contains information about the angular location of the subscriber transceiver units 130. The beam deflector control system 340 uses the subscriber transceiver unit angular location information to determine the desired locations on the mirror 261 used for deflection of the light beams.

As mentioned in the discussion of FIG. 3, the primary transceiver unit 120 also preferably transmits multiplexing control information to the optical router 110 and to the subscriber transceiver units 130. The primary transceiver unit 120 transmits the control information for one or more subscriber channels prior to transmitting the subscriber data packets associated with the one or more subscriber channels. Preferably, the multiplexing information is timing information used by the beam deflector control system 340 to control the beam deflector 240 regarding when to deflect the light beams to and from a particular location on the mirror 261. A first subscriber transceiver unit 130 transmits the second light beam 150 containing data for the primary transceiver unit 120 to the optical router 110 at a time determined by the primary transceiver unit 120. Correspondingly, the primary transceiver unit 120 transmits the first light beam 140 containing data for the first subscriber to the optical router 110 at a time such that the first light beam 140 containing data for the first subscriber arrives at the optical router 110 at substantially the same time the second light beam 150 containing data from the first subscriber arrives at the optical router 110. Additionally, the beam deflector control system 340 controls the beam deflector 240 to redirect the first and second light beams between the primary transceiver unit 120 and first subscriber transceiver unit 130 during the time when the first and second light beams are passing through the optical router 110, as directed by the primary transceiver unit 120.

Preferably, the X-Y beam deflector 240 is a galvanometer mirror pair. Galvanometer mirrors are well known, particularly in the art of laser printer technology and the art of laser light shows.

One embodiment contemplates the beam deflector 240 comprising a plurality of such galvanometer mirror pairs. Each galvanometer mirror pair deflects a different light beam between the mirror 261 and the optical antenna 210. The primary transceiver unit 120 transmits the first light beam 140 which is comprised of multiple light beams each of a different wavelength, i.e., the first light beam 140 includes a plurality of different wavelengths. The optical router 110 splits the first light beam 140 into respective wavelength portions which are deflected by respective beam deflectors. Conversely, multiple subscriber transceiver units 130 transmit second light beams 150 of differing wavelengths which arrive simultaneously at the optical router 110. The optical router 110 combines the multiple wavelength second light beams 150 and transmits the multiple wavelength second light beam 150 to the primary transceiver unit 120.

Other embodiments contemplate the beam deflector 240 comprising one or more acousto-optic or solid state beam deflectors.

Preferably the mirror 261 is a conical or hemispherical mirror wherein the cone axis is in a vertical orientation, thus providing 360 degree access to subscribers with an elevation aperture covering the access area to a range of approximately between 2000 and 4000 feet. The mirror 261 is circumscribed by a lens set 262. The lens set 262 preferably comprises a plurality of relatively small positive lenses arrayed in a conical or hemispherical fashion. As the relatively small diameter first light beam 140 reflects from the mirror 261, the first light beam 140 expands in diameter. The lens set 262 re-collimates the expanding first light beam 140 back to a slightly converging first light beam 140 for atmospheric transmission to the subscriber transceiver units 130. Conversely, the lens set 262 focuses the second light beam 150 from the subscriber transceiver units 130 onto the mirror 261. An aperture is formed in the lens set 262 through which the relatively small diameter first and second light beams travel between the X-Y beam deflector 240 and the mirror 261. The mirror 261 and lens set 262 collimate beam 150 in a manner optimized for the optical router 261 access area.

By employing optical components to converge and re-collimate the light beams as described previously, the internal components of the optical router 110, such as the beam deflector, advantageously operate on relatively narrow light beams. This improves the accuracy of beam redirection. Conversely, by employing optical components to expand and re-collimate the light beams as described previously, the light beams traveling through the atmosphere between network elements are advantageously relatively wide light beams. This improves the reception characteristics of the light beams as they are received by the receivers of the network components.

The optical router 110 further comprises a receiver 370 and a beam separator 380. Preferably, the optical router 110 establishes a control channel between the primary transceiver unit 120 and the optical router 110 for use in communicating control information, as previously discussed, from the primary transceiver unit 120 to the optical router 110. The control channel is distinct from the subscriber channels. Preferably, the beam deflector control system 340 controls the beam deflector 240 to redirect a particular first light beam 140 to the beam separator 380 rather than to the subscriber transceiver units 130. This redirection to the beam separator 380 rather than to the subscriber units 130 preferably occurs at preset periods of time. The beam separator 380 redirects the particular first light beam 140 to the receiver 370, which receives the first light beam 140. The primary transceiver unit 120 correspondingly modulates the control information data on the first light beam 140 to be received and demodulated by the beam demodulator 372 in the receiver 370. The receiver 370 is coupled to the beam deflector control system 340 and communicates the control information data to the beam deflector control system 340. The beam demodulator 372 preferably comprises a photodiode as is common in the art.

Preferably, the control channel is established in a time-multiplexed manner. During a time period, which is distinct from time periods devoted to subscriber channels, the beam control system 340 controls the beam deflector 240 to deflect the first light beam 140 to a location on the mirror 261 such that the first light beam 140 is reflected to the beam separator 380 rather than to the subscriber transceiver units 130. The primary transceiver unit 120 instructs the optical router 110 to establish this control channel prior to the time for the optical router 110 to establish the control channel. Preferably, during initialization, the optical router 110 devotes all communication channels to be control channels until instructed by the primary transceiver unit 120 to allocate subscriber channels.

In an alternate embodiment, the control channel is established in a frequency-multiplexed manner wherein a light beam of a distinct frequency, which is distinct from frequencies devoted to subscriber channels, is devoted to control channels.

The optical router 110 further comprises an active optics control system 350, such as are well known, particularly in the defense industry. The active optics control system 350 provides stabilization of the first light beam 140 on the optical antenna 210 of the optical router 110 and the second light beam 150 on the optical antenna 710 (of FIG. 8) of the primary transceiver unit 120. As the first light beam 140 travels from the optical antenna 210 to the beam deflector 240, a small portion of the first light beam 140 is split by a beam splitter 230 and redirected to a beam alignment detector 352. The beam alignment detector 352 detects misalignment or wander in the first light beam 140 which may occur and stores the beam stabilization information. Atmospheric turbulence and density variations along the atmospheric path between the primary transceiver unit 120 and the optical router 110 may account for misalignment of the first light beam 140 on the optical router 110. Likewise, events such as ground shifting or tower sway may cause the positions of the primary transceiver unit 120 or optical router 110 relative to each other to change.

The active optics control system 350 communicates the beam stabilization information to the primary transceiver unit 120 on a control channel. The primary transceiver unit 120 uses the beam stabilization information to make corrections and stabilize the first light beam 140 on the optical router 110.

The optical router 110 further comprises a transmitter 360 including a light source 362 and a beam modulator 364. The active optics control system 350 provides the beam stabilization information of the first light beam 140 to the transmitter 360. The light source 362 generates and atmospherically transmits a control light beam 250. The beam modulator 364 modulates the positional information on the control light beam 250 as it travels through the beam separator 380 to the mirror 261. Thus a control channel is established between the optical router 110 and the primary transceiver unit 120, similar to the control channel described above in which the primary transceiver unit 120 transmits control information to the optical router 110, but in the opposite direction. That is, while the beam deflector 240 is controlled to deflect the first light beam 140 to the mirror 261 such that the mirror 261 reflects the first light beam 140 to the receiver 370, the beam deflector 240 also deflects the control light beam 250 from the mirror 261 to the optical antenna 210. This provides a two-way or bi-directional control channel.

The optical router 110 light source 362 preferably comprises one or more continuous wave or pulsed beam lasers as are well known in the art, such as gas, solid state or diode lasers. The beam modulator 364 preferably comprises an electro-optic cell. Alternatively, the beam modulator 364 is a bulk type modulator. The light source and beam modulator configuration is indicative of those well known in fiber optic communication link transmission systems. However, the laser power output is typically significantly greater than those used in fiber optic systems.

Additionally, the active optics control system 350 uses the beam misalignment information to control the beam adjuster 220 to adjust the first light beam 140 optimally into the beam deflector 240.

As previously mentioned the primary transceiver unit 120 communicates control information to the optical router 110. The control information further comprises beam stabilization information which the optical router 110 receives on the control channels. The active optics control system 350 of the optical router 110 uses the beam stabilization information from the primary transceiver unit 120 to control the optical antenna 210 and beam adjuster 220 to make corrections and stabilize the second light beam 150 on the primary transceiver unit 120.

In an alternate embodiment, the optical router active optics control system 350 further comprises a second beam alignment detector (not shown) which detects misalignment or wander in the second light beam 150 from the subscriber transceiver units 130 and stores the beam stabilization information. The optical router 110 communicates the beam stabilization information to the primary transceiver unit 120. The primary transceiver unit 120 in turn communicates the beam stabilization information to the subscriber transceiver units 130. The active optics control systems in the subscriber transceiver units 130, discussed below, use the beam stabilization information from the primary transceiver unit 120 to control the subscriber transceiver unit optical antennas and beam adjusters to make corrections for misalignment or wander and stabilize the second light beam 150 on the optical router 110.

In one embodiment the beam separator 380 is a dichroic mirror. In another embodiment, the first light beam 140 and second light beam 150 are orthogonally polarized and the beam separator 380 is a polarization separator.

Preferably, the optical router 110 periodically polls the subscriber transceiver units 130 by allocating a communication channel to each of the subscriber transceiver units 130 within the range of accessibility of the optical router 110. However, the optical router 110 may lose reception of the second light beam 150 from a given subscriber transceiver unit for a significant period of time. The most common cause of the reception loss is the subscriber transceiver unit being powered off. When the optical router 110 detects reception loss, the optical router 110 preferably and advantageously polls the powered-off subscriber less frequently than subscriber transceiver units which are actively transmitting a second light beam 150 to the optical router 110.

The Primary Transceiver Unit

Figure 8:
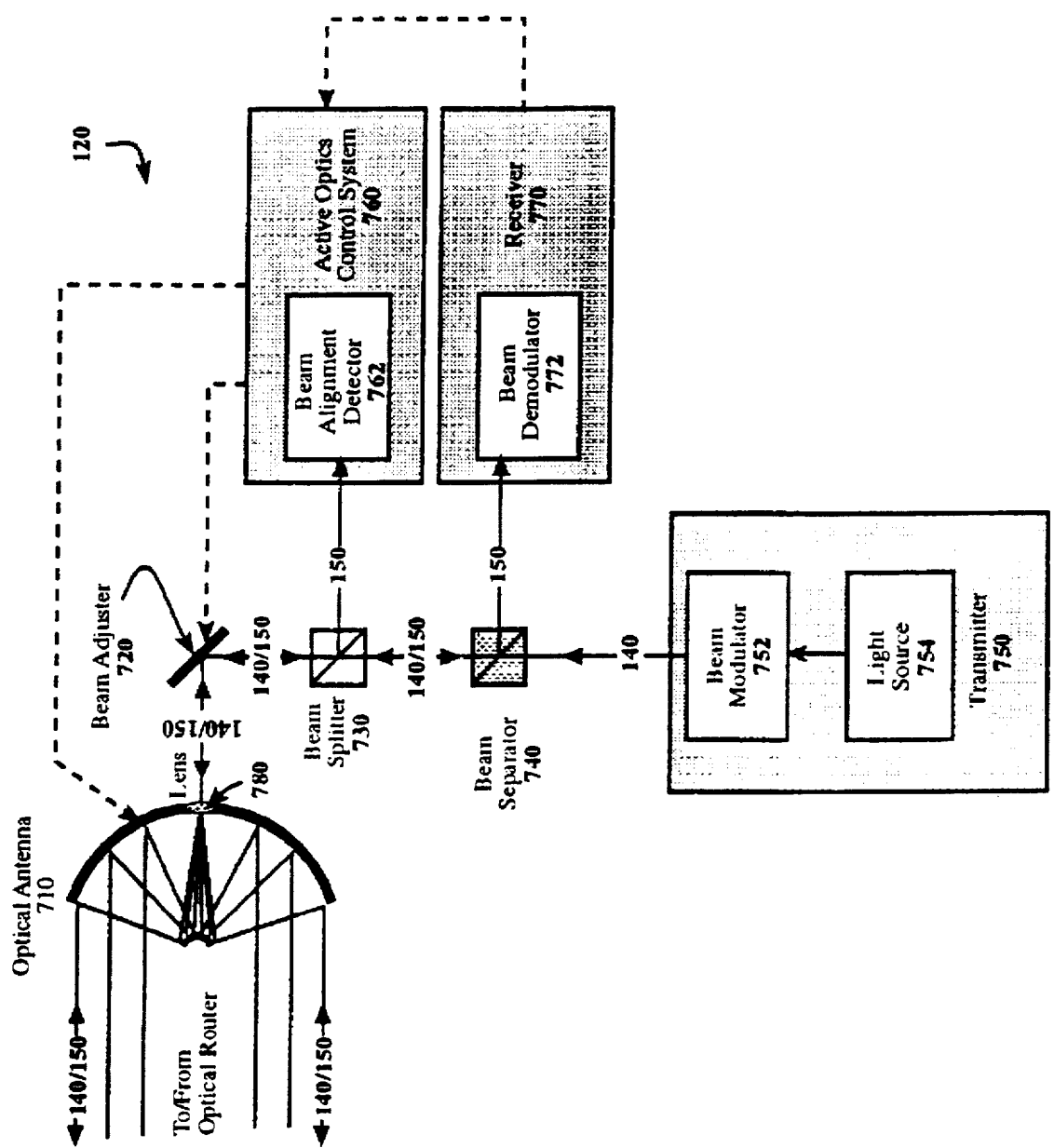
FIG. 8 illustrates the primary transceiver unit of FIGS. 1 and 3.

Referring now to FIG. 8, the preferred embodiment of the primary transceiver unit 120 in the network 100 (of FIG. 1)

is shown. The primary transceiver unit 120 comprises an optical antenna 710 optically coupled to a transmitter 750 and a receiver 770.

The optical antenna 710 transmits the first light beam 140 to the optical router 110 (of FIG. 1) and receives the fourth light beam 150 from the optical router 110. (It is noted that for the network 100 where the alternate embodiment of the optical router 110 is employed, i.e., the network of FIG. 3, the optical antenna 710 receives the second light beam 150.) The optical antenna 710 preferably is similar to the optical antenna 210 of the optical router 110. An optical antenna 710 of the primary transceiver unit 120 is contemplated with different dimensions and optical characteristics than the optical antenna 210 of the optical router 110.

The optical antenna 710 of the primary transceiver unit 120 is preferably larger than the subscriber transceiver unit optical antenna. Preferably, the receiver 770 of the primary transceiver unit 120 is more sensitive, i.e., able to demodulate a weaker light beam, than that of the subscriber transceiver units. Thus the subscriber transceiver unit light source, discussed below, may be less powerful, thus reducing the cost of the subscriber transceiver units. In other words, the primary transceiver unit 120 transmitter light source 754 is preferably more powerful than the subscriber transceiver unit light source. This allows the subscriber transceiver unit antenna, discussed below, to be relatively small and the subscriber transceiver unit receiver, discussed below, to be relatively less sensitive. Hence the total cost of the system is reduced since the number of subscriber transceiver units is typically much greater than the number of primary transceiver units in the network.

A data source/sink (not shown) provides data to the primary transceiver unit 120 to be sent to the subscriber transceiver units 130. The data source/sink ties into and/or uses existing communication structures such as a telephone network, cable television system, the Internet or other networks employing Asynchronous Transfer Mode (ATM), switched-ethernet, SONNET, FDDI, Fibre-Channel, Serial Digital Heirarchy, etc. Various means for coupling the data source/sink to the primary transceiver unit 120 are contemplated, such as fiber-optic cable, satellite up-links and down-links, atmospheric light beams, coaxial cable, microwave links, etc. The light source 754 generates and atmospherically transmits the first light beam 140 upon which the beam modulator 752 modulates the data to be sent to the subscriber transceiver units 130. A beam adjuster 720, which preferably comprises an adjustable fine steering mirror, receives and reflects the first light beam 140 to a lens assembly 780 and optical antenna 710 which expand, re-collimate and transmit the first light beam 140 to the optical router 110.

Conversely, the primary transceiver unit optical antenna 710 atmospherically receives the fourth light beam 150 from the optical router 110, and the lens assembly 780 focuses the fourth light beam 150 onto the beam adjuster 720. The beam adjuster 720 reflects the narrowed fourth light beam 150 to a beam separator 740. The beam separator 740 is similar to that of the optical router 110. The beam separator 740 redirects the fourth light beam 150 to the receiver 770. The beam demodulator 772 receives the fourth light beam 150 and demodulates the data sent by the subscriber transceiver units 130. The data is then provided to the data source/sink. The beam demodulator 772 preferably comprises a photo-diode, as is common in the art.

The primary transceiver unit light source 754 preferably comprises one or more continuous wave or pulsed beam lasers as are well known in the art, such as gas, solid state or diode lasers. The beam modulator 752 preferably comprises an electro-optic cell. Alternatively, the beam modulator 752 is a bulk type modulator. The light source and beam modulator configuration is similar to those well known in fiber optic communication link transmission systems. However, the laser power output is typically significantly greater than those used in fiber optic systems.

The light beam wavelengths generated by the atmospherically transmitting light sources described in the present invention are chosen to minimize the power loss through the atmosphere. Preferably the wavelengths are in the near infrared range.

The lens assembly 780 and optical antenna 710 are configured to transmit the first light beam 140 having a beam waist which is advantageously located at the optical router 110. The diameter of the first light beam 140 leaving the optical antenna 710 is many times the diameter of the first light beam 140 exiting the light source 754. Thus the laser power density is spread over a relatively large, cross-sectional area, which enhances eye-safety. Additionally, the relatively large diameter of the light beams traveling between the components of the network improves the reception characteristics of the light beams at the optical receivers.

The primary transceiver unit 120 additionally comprises a control system (not shown) which computes the previously discussed routing, beam stabilization, timing, subscriber location and multiplexing control information.

The primary transceiver unit 120 further comprises an active optics control system 760 similar to the active optics control system 350 of the optical router 110. The primary transceiver unit active optics control system 760 cooperates with the optical router active optics control system 350 to provide stabilization of the first light beam 140 on the optical antenna 210 of the optical router 110 and the fourth light beam 150 on the optical antenna 710 of the primary transceiver unit 120.

As previously mentioned, the optical router 110 communicates beam stabilization information to the primary transceiver unit 120. The active optics control system 760 uses the beam stabilization information from the optical router 110 to control the optical antenna 710 and beam adjuster 720 to make corrections and stabilize the first light beam 140 on the optical router 110.

Additionally, the active optics control system 760 uses the beam misalignment information detected by the beam alignment detector 762 to control the beam adjuster 720 to adjust the fourth light beam 150 optimally into the receiver 770.

The Subscriber Transceiver Units

Figure 9:
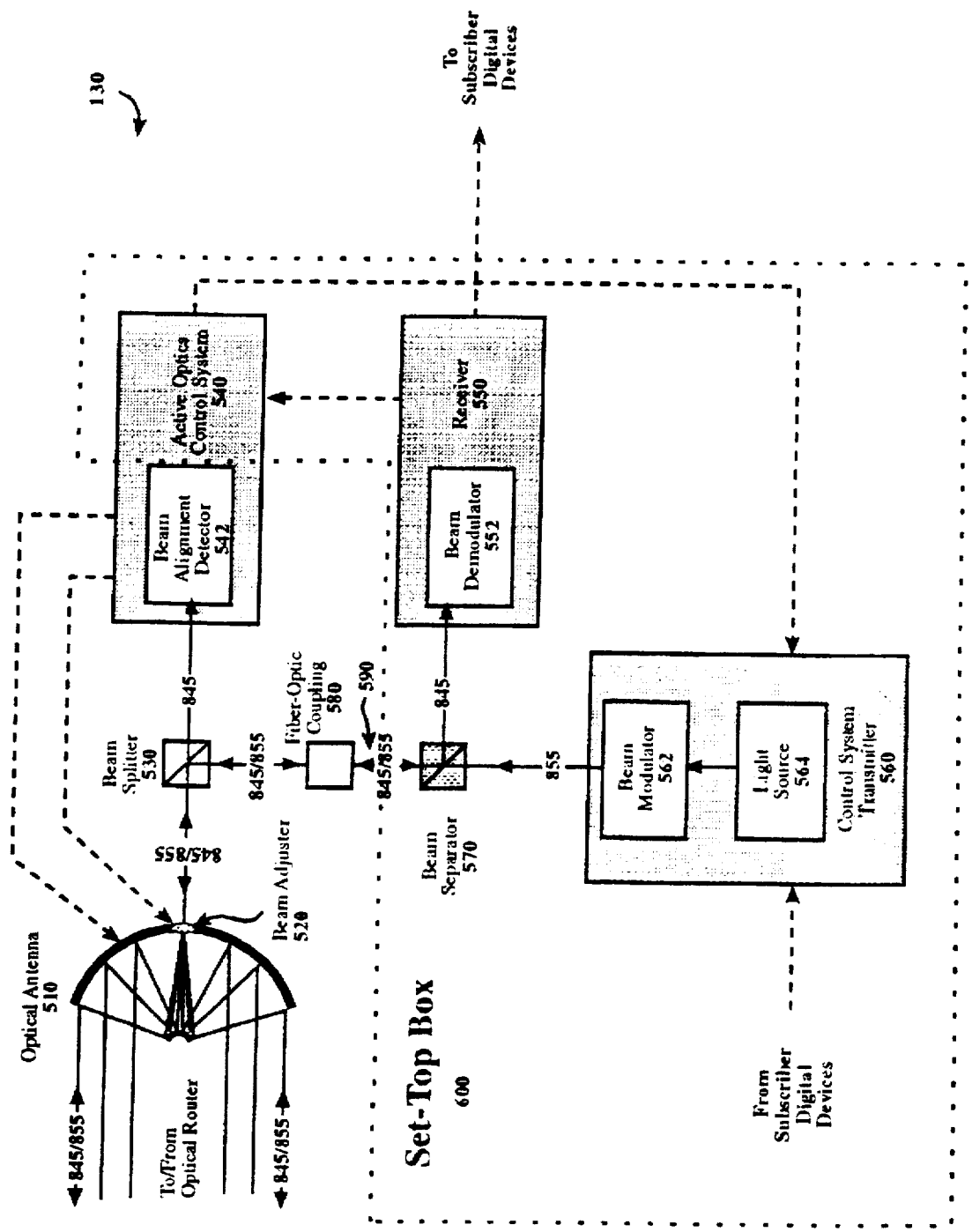
FIG. 9 illustrates a subscriber transceiver unit of FIGS. 1 and 3.

Referring now to FIG. 9, an illustration of the preferred embodiment of a subscriber transceiver unit 130A in the network 100 (of FIG. 1) is shown. Subscriber transceiver unit 130A is representative of the plurality of subscriber transceiver units 130. The subscriber transceiver unit 130A comprises an optical antenna 510 coupled to an input/output device 600, such as a set-top box 600, by a fiber optic cable 590. The input/output device 600 may be any of various devices, including a set-top box, computer system, television, radio, teleconferencing equipment, telephone or others which may be coupled to the optical antenna 510 by a fiber optic cable 590. In the remainder of this disclosure, the input/output device 600 is referred to as a set top box. Power and control wires (not shown) also couple the subscriber optical antenna 510 and the set-top box 600.

The optical antenna 510 receives the second light beam 845 from the optical router 110 (of FIG. 1) and transmits the third light beam 855 to the optical router 110. (It is noted that for the network 100 where the alternate embodiment of the optical router 110 is employed. i.e., the network of FIG. 3, the subscriber transceiver unit 130A receives the first light beam 140 from the optical router 110 and transmits the second light beam 150 to the optical router 110.) The optical antenna 510 preferably is similar to the optical antenna 210 of the optical router 110. An optical antenna 510 of the subscriber transceiver unit 130A is contemplated with different dimensions and optical characteristics than the optical antenna 210 of the optical router 110.

The optical antenna 510 receives the second light beam 845 and focuses the second light beam 845 into a fiber-optic coupling 580. The fiber-optic coupling 580 couples the second light beam 845 into the fiber optic cable 590. The fiber optic cable 590 carries the second light beam 845 to the set-top box 600. A beam separator 570 in the set-top box 600 redirects the second light beam 845 to a receiver 550 which receives the second light beam 845. A beam demodulator 552 in the receiver 550 demodulates the data from the second light beam 845. The receiver 550 provides the data to external connections (not shown) on the set-top box 600, which connect to various devices such as televisions, computers, radios, teleconferencing equipment and telephones (also not shown). The beam demodulator 552 preferably comprises a photo-diode as is common in the art.

Conversely, the various digital devices provide data to be sent to the primary transceiver unit 120 (of FIG. 1) to a transmitter 560 in the set-top box 600. The set-top box 600 comprises a light source 564 which generates the third light beam 855. A beam modulator 562 in the transmitter 560 modulates the data to be sent to the primary transceiver unit 120 on the third light beam 855. The third light beam 855 passes through the fiber optic cable 590 to the fiber-optic coupling 580. The fiber optic coupling 580 decouples the third light beam 855 from the fiber optic cable 590 and atmospherically redirects the third light beam 855 to the optical antenna 510. The optical antenna 510 then transmits the third light beam 855 including the data to the optical router 110.

The subscriber transceiver unit 130A light source 564 preferably comprises one or more continuous wave or pulsed beam lasers as are well known in the art, such as gas, solid state or diode lasers. The beam modulator 562 preferably comprises an electro-optic cell. Alternatively, the beam modulator 562 is a bulk type modulator. The light source and beam modulator configuration is similar to those well known in fiber optic communication link transmission systems. However, the laser power output is typically greater than those used in fiber optic systems.

In an alternate embodiment, previously mentioned, the subscriber transceiver unit 130A is configured to transmit and receive multiple wavelength light beams in order to increase the data bandwidth available to a given subscriber.

The subscriber transceiver unit 130A further comprises an active optics control system 540 similar to the active optics control system of the optical router 110 and the primary transceiver unit 120. The subscriber transceiver unit active optics control system 540 cooperates with the primary transceiver unit 120 active optics control system to provide stabilization of the second light beam 845 on the subscriber transceiver unit 130A and the third light beam 855 on the optical router 110.

A beam alignment detector 542 detects misalignment or wander in the second light beam 845 from the optical router 110 and stores the beam stabilization information. The subscriber transceiver unit 130A communicates the beam stabilization information regarding the first light beam 150 to the primary transceiver unit 120 via the transmitter 560. The invention contemplates the beam stabilization information being communicated to the primary transceiver unit 120 in a header in a subscriber data packet. The invention additionally contemplates the beam stabilization information being communicated to the primary transceiver unit 120 via a dedicated control data packet. The primary transceiver unit 120 utilizes the beam stabilization information when computing positional and multiplexing control information.

A beam adjuster 520 optically positioned between the optical antenna 510 and the fiber optic coupling 580 is controlled by the active optics control system 540 to maintain efficient coupling of the second light beam 845 into the fiber optic cable 590.

The optical antenna 510 is mounted on gimbals (not shown) which allow the optical antenna 510 to rotate and search for an optical router 110, or different transceiver module 800 of the preferred optical router 110, by which to receive service upon installation or upon loss of reception from a current optical router 110 or transceiver module 800.

Alternate Embodiments

An alternate embodiment of the subscriber transceiver unit 130A is contemplated in which the light beams are converted to/from electrical signals at the optical antenna 510 and transmitted in electronic form to the input/output device 600. Hence, alternative transmission mediums for coupling the optical antenna 510 to the input/output device 600 are contemplated such as coaxial cable or other forms of electrical wires.

Figure 10:
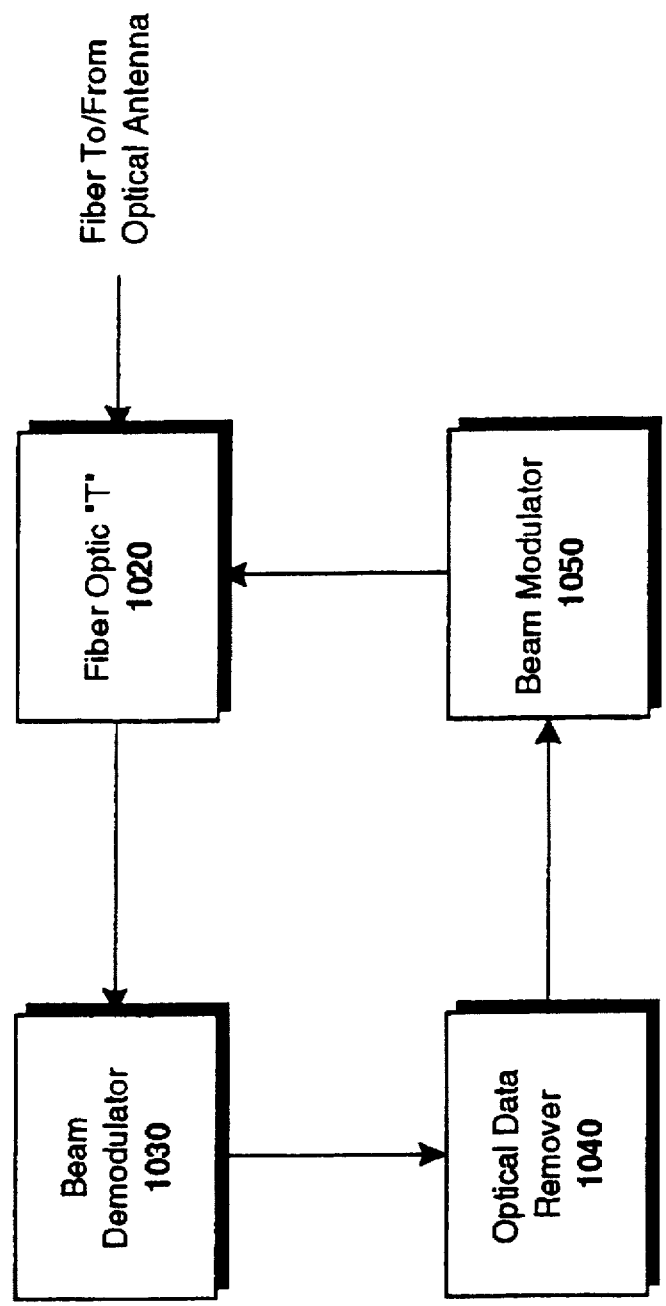
FIG. 10 is a block diagram of a portion of an alternate embodiment of the subscriber transceiver unit of FIG. 9.

Referring now to FIG. 10, an alternate embodiment of the set-top box 600 of FIG. 9 is shown. A fiber optic "T" 1020 is coupled to the fiber optic cable 590. The second light beam 845 enters the fiber optic "T" 1020 and passes along the fiber optic cable 590 to a beam demodulator 1030. The beam demodulator 1030 is similar to and performs similar functions to the beam demodulator 552 of the preferred embodiment. The second light beam 845 then passes through the fiber optic cable 590 to an optical data remover 1040. The optical data remover 1040 preferably comprises a micro-bender. The data remover 1040 removes any data which has been modulated on the second light beam 845. At this point the second light beam 845 essentially becomes the third light beam 855. The third light beam 855 is then passed along the fiber optic cable 590 to a beam modulator 1050. The beam modulator 1050 is similar to and performs similar functions to the beam modulator 562 of the preferred embodiment of the subscriber transceiver unit 130A. The third light beam 855 including the second data is then passed to the fiber optic "T" 1020 and on to the fiber optic coupling for transmission to the optical router 110. The alternate embodiment advantageously avoids the cost of a light source.

An alternate embodiment of the subscriber transceiver unit 130A optical antenna is contemplated in which the antenna is an omni-directional antenna. The omni-directional antenna is similar to the mirror and lens set assembly of the alternate embodiment of the optical router 110. Additionally, a beam deflector is provided for coupling and decoupling the light beams into and out of the fiber optic coupling 580. Alternatively, the fiber optic coupling 580 is rotatably mounted. The alternate embodiment advantageously enables the subscriber unit 130 to receive service from an alternate optical router 110 with minimal interruption of data transmission. In addition, installation of the subscriber transceiver unit 130 is simplified in that virtually no alignment must be performed upon installation, other than achieving a line of sight path to one or more optical routers 110.

The present invention contemplates the use of fiber optic amplifiers, such as an EDFA (erbium-doped fiber amplifier), in one or more of the various network elements for amplifying the various light beams in order to achieve appropriate signal power levels of the various light beams within the network.

The present invention contemplates the use of atomic line filters, which act as optical band-pass filters for selected light wavelengths, in one or more of the various network element receivers for filtering out necessary light wavelengths, such as sunlight.

The present invention contemplates the use of light sources in the various network element transmitters with adjustable light beam power control. The light beam power is adjusted according to factors such as weather conditions to achieve a proper fade margin for the signal power. A fade margin of 15 dB at a 1 km range to achieve a $10^{-9}$ bit error rate is preferred.

Conclusion

Therefore, the present invention comprises a wireless point-to-multipoint wide area telecommunications network by establishing subscriber communications channels in a multiplexed manner using atmospherically transmitted light beams. The network employs an optical router to establish the communications channels between a primary transceiver unit and a plurality of subscriber transceiver units by time-multiplexing, light beam frequency multiplexing, or a combination thereof, the atmospherically transmitted light beams.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A point-to-multipoint bi-directional wide area communications network employing atmospheric optical communication, comprising:

a primary transceiver unit comprising a primary light source configured to generate a first light beam, wherein said primary transceiver unit is configured to modulate first data on said first light beam, wherein said primary transceiver unit atmospherically transmits said first light beam including said first data;

an optical router configured to receive said first light beam including said first data from said primary transceiver unit; and a plurality of subscriber transceiver units;

wherein said optical router is configured to receive said first light beam including said first data from said primary transceiver unit and redirect said first light beam to said plurality of subscriber transceiver units;

wherein each of said plurality of subscriber transceiver units is configured to atmospherically receive said first light beam from said optical router, wherein each of said plurality of subscriber transceiver units is configured to demodulate at least a portion of said first data from said first light beam;

wherein each of said plurality of subscriber transceiver units is configured to modulate respective second data on a second light beam, wherein each of said plurality of subscriber transceiver units atmospherically transmits said second light beam including said respective second data;

wherein said optical router is configured to receive a plurality of said second light beams including said respective second data from said plurality of subscriber transceiver units and redirect said second light beams to said primary transceiver unit;

wherein said primary transceiver unit atmospherically receives said second light beams including said respective second data, wherein said primary transceiver unit is configured to demodulate said respective second data from said second light beams; and wherein said primary transceiver unit, said optical router and said plurality of subscriber transceiver units comprise a wide area optical telecommunications network.

2. The network of claim 1, wherein said optical router redirects said first light beam to respective ones of said plurality of subscriber transceiver units from said primary transceiver unit and redirects said second light beam from respective ones of said plurality of subscriber transceiver units to said primary transceiver unit during respective time periods.

3. The network of claim 1, wherein said first and second light beams comprise a plurality of wavelengths, wherein said optical router redirects said first light beam to respective ones of said plurality of subscriber transceiver units from said primary transceiver unit and redirects said second light beam from respective ones of said plurality of subscriber transceiver units to said primary transceiver unit according to respective wavelengths of said first and second light beams.

4. The network of claim 1, further comprising a plurality of said optical routers configured to atmospherically redirect a plurality of said first and second light beams between said primary transceiver unit and a plurality of said plurality of subscriber transceiver units.

5. The network of claim 4, wherein each of said plurality of optical routers has an associated range of accessibility to one or more of said plurality of said plurality of subscriber transceiver units, wherein said plurality of optical routers and said one or more of said plurality of said plurality of subscriber transceiver units are spatially located whereby said one or more of said plurality of said plurality of subscriber transceiver units are within said associated range of accessibility of at least two of said plurality of optical routers.

6. The network of claim 1, wherein said first light beam and said second light beam are substantially collinear.

7. The network of claim 6, wherein said first light beam and second light beam have different wavelengths or polarities.

8. The network of claim 1, wherein said optical router comprises:

an optical antenna which atmospherically receives said first light beam including said first data from said primary transceiver unit and atmospherically transmits said second light beam including said respective second data to said primary transceiver unit;

a mirror which reflects said first and second light beams between said optical antenna and said plurality of subscriber transceiver units;

an X–Y beam deflector optically positioned between said optical antenna and said mirror which deflects said first and second light beams between said optical antenna and said mirror; and a beam deflector control system coupled to said X–Y beam deflector which controls said X–Y beam deflector to deflect said first and second light beams between said optical antenna and said mirror.

9. The network of claim 1,
wherein said optical router comprises an active optics beam control system;
wherein said primary transceiver unit comprises an active optics beam control system;
wherein said optical router active optics beam control system and said primary transceiver unit active optics beam control system cooperate to maintain optical stabilization of said first light beam from said primary transceiver unit to said optical router.

10. The network of claim 1,
wherein each of said plurality of subscriber transceiver units comprises an active optics beam control system;
wherein said optical router comprises an active optics beam control system;
wherein each of said plurality of subscriber transceiver unit active optics beam control systems and said optical router active optics beam control system cooperate to maintain optical stabilization of said second light beam from each of said plurality of subscriber transceiver units to said optical router.

11. The network of claim 1, wherein each of said plurality of subscriber transceiver units includes a subscriber light source configured to generate said second light beam.

12. The network of claim 1, wherein each of said plurality of subscriber transceiver units is configured to remove said first data from said first light beam after demodulating at least a portion of said first data from said first light beam and before modulating said respective second data on said second light beam, wherein said first light beam is said second light beam.

13. The network of claim 1, wherein each of said plurality of subscriber transceiver units includes a subscriber optical antenna coupled to an input/output device by a transmission medium, wherein at least a portion of said first data and said second data are communicated between said subscriber optical antenna and said input/output device along said transmission medium.

14. The network of claim 13, wherein said transmission medium is a fiber optic cable, wherein said subscriber optical antenna is configured to couple said first light beam including at least a portion of said first data into said fiber optic cable to said input/output device, wherein said input/output device is configured to demodulate at least a portion of said first data from said first light beam, wherein said input/output device further comprises a subscriber light source which generates said second light beam, wherein said input/output device is configured to modulate said respective second data on said second light beam, wherein said subscriber optical antenna is configured to decouple said second light beam including said respective second data from said fiber optic cable and atmospherically transmit said second light beam including said respective second data to said optical router.

15. The network of claim 13, wherein said transmission medium is a fiber optic cable, wherein said subscriber optical antenna is configured to couple said first light beam including at least a portion of said first data into said fiber optic cable to said input/output device, wherein said input/output device is configured to demodulate at least a portion of said first data from said first light beam, wherein said input/output device is configured to modulate said respective second data on said second light beam, wherein said input/output device is configured to remove said first data from said first light beam after demodulating at least a portion of said first data from said first light beam and before modulating said respective second data on said second light beam, wherein said first light beam is said second light beam, wherein said subscriber optical antenna is configured to decouple said second light beam including said respective second data from said fiber optic cable and atmospherically transmit said second light beam including said respective second data to said optical router.

16. The network of claim 1, wherein said primary transceiver unit transmits timing control information to said plurality of subscriber transceiver units, wherein said plurality of subscriber transceiver units utilize said timing control information to determine when to transmit said second light beam including said respective second data.

17. The network of claim 1, wherein each of said plurality of subscriber transceiver units comprises a rotatably mounted optical antenna, wherein each of said plurality of subscriber transceiver units is configured to rotate said optical antenna to detect the location of said optical router.

18. The network of claim 17 further comprising a plurality of optical routers, wherein said plurality of subscriber transceiver units rotate said optical antenna to detect an alternate optical router upon losing reception of said first light beam.

19. The network of claim 1, wherein said first and second light beams have adjustable power levels to achieve a proper fade margin according to varying atmospheric conditions.

20. A point-to-multipoint bi-directional wide area communications network employing an atmospheric optical communications path comprising:
a plurality of subscriber transceiver units each configured to modulate respective first data on a first light beam, wherein each of said plurality of subscriber transceiver units atmospherically transmits said first light beam including said respective first data, wherein each of said plurality of subscriber transceiver units atmospherically receives a second light beam including respective second data, wherein each of said plurality of subscriber transceiver units is configured to demodulate said respective second data from said second light beam, wherein said atmospheric optical communications path comprises said first light beam and said second light beam;
a primary transceiver unit comprising a primary light source configured to generate said second light beam, wherein said primary transceiver unit is configured to modulate said respective second data on said second light beam, wherein said primary transceiver unit atmospherically transmits said second light beam including said respective second data, wherein said primary transceiver unit atmospherically receives said first light beam including said respective first data, wherein said primary transceiver unit is configured to demodulate said respective first data from said first light beam; and
an optical router configured to atmospherically redirect said first and second light beams between said primary transceiver unit and said plurality of subscriber transceiver units;
wherein said primary transceiver unit, said optical router and said plurality of subscriber transceiver units comprise a wide area optical telecommunications network.

21. The network of claim 20, wherein said optical router is configured to redirect said first and second light beams between said primary transceiver unit and a first of said plurality of subscriber transceiver units during a first time period and redirect said first and second light beams between said primary transceiver unit and a second of said plurality of subscriber transceiver units during a second time period.

22. The network of claim 20, wherein said second light beam comprises a first wavelength light beam and a second wavelength light beam, wherein said optical router redirects said first wavelength light beam to a first of said plurality of subscriber transceiver units from said primary transceiver unit, wherein said optical router redirects said second wavelength light beam to a second of said plurality of subscriber transceiver units from said primary transceiver unit.

23. The network of claim 20, wherein said first light beam comprises a first wavelength light beam and a second wavelength light beam, wherein said optical router redirects said first wavelength light beam from a first of said plurality of subscriber transceiver units to said primary transceiver unit, wherein said optical router redirects said second wavelength light beam from a second of said plurality of subscriber transceiver units to said primary transceiver unit.

24. The network of claim 20 further comprising a plurality of said optical routers configured to atmospherically redirect a plurality of said first and second light beams between said primary transceiver unit and a plurality of said plurality of subscriber transceiver units.

25. The network of claim 24, wherein each of said plurality of optical routers has an associated range of accessibility to one or more of said plurality of said plurality of subscriber transceiver units, wherein said plurality of optical routers and said one or more of said plurality of said plurality of subscriber transceiver units are spatially located whereby said one or more of said plurality of said plurality of subscriber transceiver units are within said associated range of accessibility of at least two of said plurality of optical routers.

26. The network of claim 20, wherein said optical router comprises:
an optical antenna which atmospherically receives said second light beam including said respective second data from said primary transceiver unit and atmospherically transmits said first light beam including said respective first data to said primary transceiver unit;
a mirror which reflects said first and second light beams between said optical antenna and said plurality of subscriber transceiver units;
an X-Y beam deflector optically positioned between said optical antenna and said mirror which deflects said first and second light beams between said optical antenna and said mirror; and
a beam deflector control system coupled to said X-Y beam deflector which controls said X-Y beam deflector to deflect said first and second light beams between said optical antenna and said mirror.

27. The network of claim 20, wherein each of said plurality of subscriber transceiver units comprises a subscriber light source configured to generate said first light beam.

28. The network of claim 20, wherein each of said plurality of subscriber transceiver units comprises a subscriber optical antenna coupled to an input/output device by a transmission medium, wherein at least a portion of said respective first data and said second data are communicated between said subscriber optical antenna and said input/output device along said transmission medium.

29. A broadcast wide area optical communications network employing atmospheric optical communication, comprising:
a primary transceiver unit comprising a primary light source configured to generate a first light beam, wherein said primary transceiver unit is configured to modulate first data on said first light beam, wherein said primary transceiver unit atmospherically transmits said first light beam including said first data;
an optical router configured to receive said first light beam including said first data from said primary transceiver unit; and
a plurality of subscriber transceiver units;
wherein said optical router is configured to receive said first light beam including said first data from said primary transceiver unit and redirect said first light beam to said plurality of subscriber transceiver units;
wherein each of said plurality of subscriber transceiver units is configured to atmospherically receive said first light beam from said optical router, wherein each of said plurality of subscriber transceiver units is configured to demodulate at least a portion of said first data from said first light beam;
wherein said primary transceiver unit, said optical router and said plurality of subscriber transceiver units comprise a wide area optical telecommunications network.

30. The network of claim 29, wherein said optical router redirects said first light beam to respective ones of said plurality of subscriber transceiver units from said primary transceiver unit during respective time periods.

31. The network of claim 29, wherein said first light beam comprises a plurality of wavelengths, wherein said optical router redirects said first light beam to respective ones of said plurality of subscriber transceiver units from said primary transceiver unit according to respective wavelengths of said first light beam.

32. The network of claim 29 further comprising a plurality of said optical routers configured to atmospherically redirect a plurality of said first light beam between said primary transceiver unit and a plurality of said plurality of subscriber transceiver units.

33. The network of claim 32, wherein each of said plurality of optical routers has an associated range of accessibility to one or more of said plurality of said plurality of subscriber transceiver units, wherein said plurality of optical routers and said one or more of said plurality of said plurality of subscriber transceiver units are spatially located whereby said one or more of said plurality of said plurality of subscriber transceiver units are within said associated range of accessibility of at least two of said plurality of optical routers.

34. The network of claim 29, wherein said optical router comprises:
an optical antenna which atmospherically receives said first light beam including said first data from said primary transceiver unit;
a mirror which reflects said first light beam between said optical antenna and said plurality of subscriber transceiver units;
an X-Y beam deflector optically positioned between said optical antenna and said mirror which deflects said first light beam between said optical antenna and said mirror; and
a beam deflector control system coupled to said X-Y beam deflector which controls said X-Y beam deflector to deflect said first light beam between said optical antenna and said mirror.

35. The network of claim 29, wherein each of said plurality of subscriber transceiver units comprises a subscriber optical antenna coupled to an input/output device by a transmission medium, wherein at least a portion of said first data is communicated between said subscriber optical antenna and said input/output device along said transmission medium.

36. An optical router for routing atmospheric light beams between a primary transceiver unit and a plurality of subscriber transceiver units, comprising:

an optical antenna which atmospherically receives one or more first light beams including first data from said primary transceiver unit and atmospherically transmits one or more second light beams including respective second data to said primary transceiver unit;

a mirror which reflects said first and second light beams between said optical antenna and said plurality of subscriber transceiver units;

an X–Y beam deflector optically positioned between said optical antenna and said mirror which deflects said first and second light beams between said optical antenna and said mirror; and a beam deflector control system coupled to said X–Y beam deflector which controls said X–Y beam deflector to deflect said first and second light beams between said optical antenna and said mirror.

37. The optical router of claim 36, wherein during a first time period said optical router redirects said first and second light beams between said primary transceiver unit and a first of said plurality of subscriber transceiver units, wherein during a second time period said optical router redirects said first and second light beams between said primary transceiver unit and a second of said plurality of subscriber transceiver units.

38. The optical router of claim 36, wherein said first light beams comprises a first wavelength light beam and a second wavelength light beam, wherein said optical router redirects said first wavelength light beam to a first of said plurality of subscriber transceiver units from said primary transceiver unit, wherein said optical router redirects said second wavelength light beam to a second of said plurality of subscriber transceiver units from said primary transceiver unit.

39. The optical router of claim 36, wherein said optical router receives routing control information from said primary transceiver unit, wherein said beam deflector control system uses said routing control information to control said X–Y beam deflector.

40. The optical router of claim 39, wherein said routing control information comprises angular position information about each of said plurality of subscriber transceiver units and router time switching information.

41. The optical router of claim 37 further comprising:

an optical receiver;

wherein during a third time period said beam deflector control system controls said X–Y beam deflector to deflect said first light beams from said primary transceiver to said mirror such that said mirror reflects said first light beams to said optical receiver rather than to said plurality of subscriber transceiver units, wherein said optical receiver receives said first light beams, wherein said first light beams include routing control information, wherein said optical receiver demodulates said routing control information from said first light beams, wherein said beam deflector control system is coupled to said optical receiver and receives said routing control information from said optical receiver, wherein said beam deflector control system uses said routing control information to control said X–Y beam deflector.

42. The optical router of claim 38 further comprising:

an optical receiver;

wherein said first light beams comprise a third wavelength light beam, wherein said beam deflector control system controls said X–Y beam deflector to deflect said first light beams from said primary transceiver to said mirror such that said mirror reflects said third wavelength light beam to said optical receiver rather than to said plurality of subscriber transceiver units, wherein said optical receiver receives said third wavelength light beam, wherein said third wavelength light beam includes routing control information, wherein said optical receiver demodulates said routing control information from said third wavelength light beam, wherein said beam deflector control system is coupled to said optical receiver and receives said routing control information from said optical receiver, wherein said beam deflector control system uses said routing control information to control said X–Y beam deflector.

43. The optical router of claim 36, wherein said first light beam and said second light beam are substantially collinear.

44. The optical router of claim 36, wherein said mirror is a convex mirror, wherein said optical router further comprises a lens set substantially concentric with said convex mirror, wherein said convex mirror is positioned within said lens set, wherein said lens set expands and re-collimates said first light beam from said convex mirror to said plurality of subscriber transceiver units, wherein said lens set focuses said second light beam from said plurality of subscriber transceiver units on said convex mirror.

45. The optical router of claim 44, wherein an aperture is formed in said lens set through which said first and second light beams travel between said X–Y beam deflector and said convex mirror.

46. The optical router of claim 44, wherein said mirror and said lens set collimate said second light beam, wherein said second light beam is collimated in a manner optimized for the access area of the optical router.

47. The optical router of claim 36, wherein said X–Y beam deflector is one or more galvanometer mirror pairs.

48. The optical router of claim 36, wherein said X–Y beam deflector is one or more acousto-optic deflectors.

49. The optical router of claim 36, wherein said X–Y beam deflector is one or more solid-state beam deflectors.

50. The optical router of claim 36 further comprising:

an active optics beam control system in cooperation with said primary transceiver unit to maintain optical stabilization of said first light beams from said primary transceiver unit on said optical antenna.

51. The optical router of claim 36 further comprising:

an active optics beam control system in cooperation with said primary transceiver unit and said plurality of subscriber transceiver units to maintain optical stabilization of said second light beams from said subscriber transceiver units on said optical antenna.

52. The optical router of claim 36 further comprising:

an active optics beam control system which detects and adjusts for angular misalignment of said first light beams from said primary transceiver unit to said X–Y beam deflector.

53. An optical router for routing atmospheric light beams from a primary transceiver unit to a plurality of subscriber transceiver units, comprising:

an optical antenna which atmospherically receives one or more first light beams including first data from said primary transceiver unit;

a mirror which reflects said one or more first light beams from said optical antenna to said plurality of subscriber transceiver units;

an X–Y beam deflector optically positioned between said optical antenna and said mirror which deflects said one or more first light beams from said optical antenna to said mirror; and a beam deflector control system coupled to said X–Y beam deflector which controls said X–Y beam deflector to deflect said first light beams from said optical antenna to said mirror.

54. The optical router of claim 53, wherein during a first time period said optical router redirects said first light beam between said primary transceiver unit and a first of said plurality of subscriber transceiver units, wherein during a second time period said optical router redirects said first light beam between said primary transceiver unit and a second of said plurality of subscriber transceiver units.

55. The optical router of claim 53, wherein said first light beams comprises a first wavelength light beam and a second wavelength light beam, wherein said optical router redirects said first wavelength light beam to a first of said plurality of subscriber transceiver units from said primary transceiver unit, wherein said optical router redirects said second wavelength light beam to a second of said plurality of subscriber transceiver units from said primary transceiver unit.

56. The optical router of claim 53, wherein said optical router receives routing control information from said primary transceiver unit, wherein said beam deflector control system uses said routing control information to control said X–Y beam deflector.

57. The optical router of claim 53, wherein said mirror is a convex mirror, wherein said optical router further comprises a lens set substantially concentric with said convex mirror, wherein said convex mirror is positioned within said lens set, wherein said lens set expands and re-collimates said first light beam from said convex mirror to said plurality of subscriber transceiver units.

58. A point-to-multipoint bi-directional wide area communications network employing atmospheric optical communication, comprising:

a primary transceiver unit comprising a primary light source configured to generate a first light beam, wherein said primary transceiver unit is configured to modulate first data on said first light beam, wherein said primary transceiver unit atmospherically transmits said first light beam including said first data;

an optical router configured to atmospherically receive said first light beam including said first data from said primary transceiver unit; and a plurality of subscriber transceiver units;

wherein said optical router is configured to atmospherically receive said first light beam including said first data from said primary transceiver unit, wherein said optical router atmospherically transmits a second light beam including said first data to said plurality of subscriber transceiver units;

wherein each of said plurality of subscriber transceiver units is configured to atmospherically receive said second light beam including said first data from said optical router, wherein each of said plurality of subscriber transceiver units is configured to demodulate at least a portion of said first data from said second light beam;

wherein each of said plurality of subscriber transceiver units is configured to modulate respective second data on a third light beam, wherein each of said plurality of subscriber transceiver units atmospherically transmits said third light beam including said respective second data to said optical router;

wherein said optical router is configured to atmospherically receive said third light beam including said respective second data from said plurality of subscriber transceiver units, wherein said optical router atmospherically transmits a fourth light beam including said respective second data to said primary transceiver unit; and wherein said primary transceiver unit atmospherically receives said fourth light beam including said respective second data, wherein said primary transceiver unit is configured to demodulate said respective second data from said fourth light beams wherein said primary transceiver unit said optical router and said plurality of subscriber transceiver units comprise a wide area optical telecommunications network.

59. The network of claim 58, wherein said optical router is configured to demodulate said first data from said first light beam, wherein said optical router comprises an optical router light source configured to generate said second light beam, wherein said optical router is configured to modulate said first data on said second light beam.

60. The network of claim 58, wherein said optical router is configured to demodulate said respective second data from said third light beam, wherein said optical router comprises an optical router light source configured to generate said fourth light beam, wherein said optical router is configured to modulate said respective second data on said fourth light beam.

61. The network of claim 58, wherein said optical router is configured to atmospherically transmit said second light beam including said first data to respective ones of said plurality of subscriber transceiver units and atmospherically receive said third light beam including said respective second data from said respective ones of said plurality of subscriber transceiver units during respective time periods.

62. The network of claim 58, wherein said optical router is configured to route said first data from said primary transceiver unit to respective ones of said plurality of subscriber transceiver units and to route said respective second data from said respective ones of said plurality of subscriber transceiver units to said primary transceiver unit during respective time periods.

63. The network of claim 58, further comprising a plurality of said optical routers configured to route a plurality of said first and second data between said primary transceiver unit and a plurality of said plurality of subscriber transceiver units.

64. The network of claim 63, wherein each of said plurality of optical routers has an associated range of accessibility to one or more of said plurality of said plurality of subscriber transceiver units, wherein said plurality of optical routers and said one or more of said plurality of said plurality of subscriber transceiver units are spatially located whereby said one or more of said plurality of said plurality of subscriber transceiver units are within said associated range of accessibility of at least two of said plurality of optical routers.

65. The network of claim 58, wherein said first light beam and said fourth light beam are substantially collinear.

66. The network of claim 58, wherein said second light beam and said third light beam are substantially collinear.

67. The network of claim 58, wherein said first light beam and said fourth light beam have different wavelengths or polarities.

68. The network of claim 58, wherein said second light beam and said third light beam have different wavelengths or polarities.

69. The network of claim 58, wherein said optical router comprises:

one or more transceiver modules, wherein said one or more transceiver modules atmospherically receive said third light beam including said respective second data, wherein said one or more transceiver modules atmospherically transmit said second light beam including said first data;

a secondary transceiver unit, wherein said secondary transceiver unit atmospherically receives said first light beam including said first data, wherein said secondary transceiver unit atmospherically transmits said fourth light beam including said respective second data; and an electronic router electronically coupling said secondary transceiver unit to said one or more transceiver modules, wherein said electronic router routes said first data and said respective second data between said secondary transceiver unit and said one or more transceiver modules.

70. The network of claim 58,
wherein said optical router comprises an active optics beam control system;
wherein said primary transceiver unit comprises an active optics beam control system;
wherein said optical router active optics beam control system and said primary transceiver unit active optics beam control system cooperate to maintain optical stabilization of said first light beam from said primary transceiver unit to said optical router.

71. The network of claim 58,
wherein each of said plurality of subscriber transceiver units comprises an active optics beam control system;
wherein said optical router comprises an active optics beam control system;
wherein each of said plurality of subscriber transceiver unit active optics beam control systems and said optical router active optics beam control system cooperate to maintain optical stabilization of said third light beam from each of said plurality of subscriber transceiver units to said optical router.

72. The network of claim 58, wherein each of said plurality of subscriber transceiver units includes a subscriber light source configured to generate said third light beam.

73. The network of claim 58, wherein each of said plurality of subscriber transceiver units is configured to remove said first data from said second light beam after demodulating at least a portion of said first data from said second light beam and before modulating said respective second data on said third light beam, wherein said second light beam is said third light beam.

74. The network of claim 58, wherein each of said plurality of subscriber transceiver units includes a subscriber optical antenna coupled to an input/output device by a transmission medium, wherein at least a portion of said first data and said respective second data are communicated between said subscriber optical antenna and said input/output device along said transmission medium.

75. The network of claim 74, wherein said transmission medium is a fiber optic cable, wherein said subscriber optical antenna is configured to couple said second light beam including at least a portion of said first data into said fiber optic cable to said input/output device, wherein said input/output device is configured to demodulate at least a portion of said first data from said second light beam, wherein said input/output device further comprises a subscriber light source which generates said third light beam, wherein said input/output device is configured to modulate said respective second data on said third light beam, wherein said subscriber optical antenna is configured to decouple said third light beam including said respective second data from said fiber optic cable and atmospherically transmit said third light beam including said respective second data to said optical router.

76. The network of claim 74, wherein said transmission medium is a fiber optic cable, wherein said subscriber optical antenna is configured to couple said second light beam including at least a portion of said first data into said fiber optic cable to said input/output device, wherein said input/output device is configured to demodulate at least a portion of said first data from said second light beam, wherein said input/output device is configured to modulate said respective second data on said third light beam, wherein said input/output device is configured to remove said first data from said second light beam after demodulating at least a portion of said first data from said second light beam and before modulating said respective second data on said third light beam, wherein said second light beam is said third light beam, wherein said subscriber optical antenna is configured to decouple said third light beam including said respective second data from said fiber optic cable and atmospherically transmit said third light beam including said respective second data to said optical router.

77. The network of claim 58, wherein said primary transceiver unit transmits timing control information to said plurality of subscriber transceiver units, wherein said plurality of subscriber transceiver units utilize said timing control information to determine when to transmit said third light beam including said respective second data.

78. The network of claim 58, wherein each of said plurality of subscriber transceiver units comprises a rotatably mounted optical antenna, wherein each of said plurality of subscriber transceiver units is configured to rotate said optical antenna to detect the location of said optical router.

79. The network of claim 78 further comprising a plurality of optical routers, wherein said plurality of subscriber transceiver units rotate said optical antenna to detect an alternate optical router upon losing reception of said second light beam.

80. The network of claim 58, wherein said first, second, third and fourth light beams have adjustable power levels to achieve a proper fade margin according to varying atmospheric conditions.

81. The network of claim 58, wherein said optical router and at least one or more of said plurality of subscriber transceiver units are separated by a distance of greater than 2000 feet.

82. The network of claim 58, wherein said optical router and at least one or more of said plurality of subscriber transceiver units are separated by a distance of up to 4000 feet.

83. The network of claim 58, wherein said optical router and said primary transceiver unit are separated by a distance of more than one half mile.

84. The network of claim 58, wherein said optical router and said primary transceiver unit are separated by a distance which ranges from one half to ten miles.

85. The network of claim 58, wherein a plurality of said plurality of subscriber transceiver units are located at different subscriber premises.

86. The network of claim 85, wherein said primary transceiver unit is located at a location different from said subscriber premises.

87. A point-to-multipoint bi-directional wide area communications network employing atmospheric optical communication comprising:

a primary transceiver unit comprising a primary light source configured to generate a first light beam, wherein said primary transceiver unit is configured to modulate respective first data on said first light beam, wherein said primary transceiver unit atmospherically transmits said first light beam including said respective first data, wherein said primary transceiver unit atmospherically receives a second light beam including respective second data, wherein said primary transceiver unit is configured to demodulate said respective second data from said second light beam;

a plurality of subscriber transceiver units, wherein each of said plurality of subscriber transceiver units atmospherically receives a third light beam including said respective first data, wherein each of said plurality of subscriber transceiver units is configured to demodulate said respective first data from said third light beam, wherein each of said plurality of subscriber transceiver units is configured to modulate said respective second data on a fourth light beam, wherein each of said plurality of subscriber transceiver units atmospherically transmits said fourth light beam including said respective second data; and an optical router configured to atmospherically receive said first light beam including said respective first data from said primary transceiver unit, wherein said optical router atmospherically transmits said third light beam including said respective first data to one or more of said plurality of subscriber transceiver units, wherein said optical router is configured to receive said fourth light beams including said respective second data, wherein said optical router atmospherically transmits said second light beam including said respective second data to said primary transceiver unit;

wherein said primary transceiver unit said optical router and said plurality of subscriber transceiver units comprise a wide area optical telecommunications network.

88. The network of claim 87, wherein said optical router is configured to demodulate said respective first data from said first light beam, wherein said optical router comprises a first optical router light source configured to generate said third light beam, wherein said optical router is configured to modulate said respective first data on said third light beam.

89. The network of claim 87, wherein said optical router is configured to demodulate said respective second data from said fourth light beams, wherein said optical router comprises a second optical router light source configured to generate said second light beam, wherein said optical router is configured to modulate said respective second data on said second light beam.

90. The network of claim 87, wherein said optical router is configured to atmospherically transmit said third light beam including said respective first data to respective ones of said plurality of subscriber transceiver units and atmospherically receive said fourth light beam including said respective second data from said respective ones of said plurality of subscriber transceiver units during respective time periods.

91. The network of claim 87, wherein said optical router is configured to route said respective first data from said primary transceiver unit to respective ones of said plurality of subscriber transceiver units and to route said respective second data from said respective ones of said plurality of subscriber transceiver units to said primary transceiver unit during respective time periods.

92. The network of claim 87, further comprising a plurality of said optical routers configured to route a plurality of said respective first and second data between said primary transceiver unit and a plurality of said plurality of subscriber transceiver units.

93. The network of claim 92, wherein each of said plurality of optical routers has an associated range of accessibility to one or more of said plurality of said plurality of subscriber transceiver units, wherein said plurality of optical routers and said one or more of said plurality of said plurality of subscriber transceiver units are spatially located whereby said one or more of said plurality of said plurality of subscriber transceiver units are within said associated range of accessibility of at least two of said plurality of optical routers.

94. The network of claim 87, wherein said optical router comprises:

one or more transceiver modules, wherein said one or more transceiver modules atmospherically receive said fourth light beam including said respective second data, wherein said one or more transceiver modules atmospherically transmit said third light beam including said respective first data;

a secondary transceiver unit, wherein said secondary transceiver unit atmospherically receives said first light beam including said respective first data, wherein said secondary transceiver unit atmospherically transmits said second light beam including said respective second data; and an electronic router electronically coupling said secondary transceiver unit to said one or more transceiver modules, wherein said electronic router routes said respective first data and said respective second data between said secondary transceiver unit and said one or more transceiver modules.

95. The network of claim 87, wherein each of said plurality of subscriber transceiver units comprises a subscriber light source configured to generate said fourth light beam.

96. The network of claim 87, wherein each of said plurality of subscriber transceiver units comprises a subscriber optical antenna coupled to an input/output device by a transmission medium, wherein at least a portion of said respective first data and said respective second data are communicated between said subscriber optical antenna and said input/output device along said transmission medium.

97. A broadcast wide area communications network employing atmospheric optical communication, comprising:

a primary transceiver unit comprising a primary light source configured to generate a first light beam, wherein said primary transceiver unit is configured to modulate first data on said first light beam, wherein said primary transceiver unit atmospherically transmits said first light beam including said first data;

an optical router configured to atmospherically receive said first light beam including said first data from said primary transceiver unit; and a plurality of subscriber transceiver units;

wherein said optical router is configured to atmospherically receive said first light beam including said first data from said primary transceiver unit, wherein said optical router atmospherically transmits a second light beam including said first data to said plurality of subscriber transceiver units;

wherein each of said plurality of subscriber transceiver units is configured to atmospherically receive said second light beam including said first data from said optical router, wherein each of said plurality of subscriber transceiver units is configured to demodulate at least a portion of said first data from said second light beam;

wherein said primary transceiver unit, said optical router and said plurality of subscriber transceiver units comprise a wide area optical telecommunications network.

98. The network of claim 97, wherein said optical router is configured to demodulate said first data from said first light beam, wherein said optical router comprises an optical router light source configured to generate said second light beam, wherein said optical router is configured to modulate said first data on said second light beam.

99. The network of claim 97, wherein said optical router is configured to atmospherically transmit said second light beam including said first data to respective ones of said plurality of subscriber transceiver units during respective time periods.

100. The network of claim 97, wherein said optical router is configured to route said first data from said primary transceiver unit to respective ones of said plurality of subscriber transceiver units during respective time periods.

101. The network of claim 97, further comprising a plurality of said optical routers configured to route a plurality of said first data between said primary transceiver unit and a plurality of said plurality of subscriber transceiver units.

102. The network of claim 101, wherein each of said plurality of optical routers has an associated range of accessibility to one or more of said plurality of said plurality of subscriber transceiver units, wherein said plurality of optical routers and said one or more of said plurality of said plurality of subscriber transceiver units are spatially located whereby said one or more of said plurality of said plurality of subscriber transceiver units are within said associated range of accessibility of at least two of said plurality of optical routers.

103. The network of claim 97, wherein said optical router comprises:

one or more transceiver modules, wherein said one or more transceiver modules atmospherically transmit said second light beam including said first data;

a secondary transceiver unit, wherein said secondary transceiver unit atmospherically receives said first light beam including said first data; and an electronic router electronically coupling said secondary transceiver unit to said one or more transceiver modules, wherein said electronic router routes said first data from said secondary transceiver unit to said one or more transceiver modules.

104. The network of claim 97, wherein each of said plurality of subscriber transceiver units comprises a subscriber optical antenna coupled to an input/output device by a transmission medium, wherein at least a portion of said first data is communicated between said subscriber optical antenna and said input/output device along said transmission medium.

105. An optical router for routing data, comprising:

one or more transceiver modules, wherein said one or more transceiver modules atmospherically receive a first light beam including respective first data, wherein said one or more transceiver modules atmospherically transmit a second light beam including respective second data;

a secondary transceiver unit, wherein said secondary transceiver unit atmospherically receives a third light beam including said respective second data, wherein said secondary transceiver unit atmospherically transmits a fourth light beam including said respective first data;

an electronic router electronically coupling said secondary transceiver unit to said one or more transceiver modules, wherein said electronic router routes said respective first data and said respective second data between said secondary transceiver unit and said one or more transceiver modules; and a beam deflector control system coupled to said electronic router and said one or more transceiver modules;

wherein each of said one or more transceiver modules comprises:

a beam demodulator configured to receive said first light beam including said respective first data and demodulate said respective first data from said first light beam;

a light source configured to generate said second light beam; and an X-Y beam deflector configured to receive said first light beam from a plurality of subscriber transceiver units and deflect said first light beam to said beam demodulator, wherein said X-Y beam deflector is configured to receive said second light beam from said light source and deflect said second light beam including said respective second data to said plurality of subscriber transceiver units.

106. An optical router for routing data, comprising:

a secondary transceiver unit, wherein said secondary transceiver unit atmospherically receives a first light beam including respective first data;

one or more transceiver modules, wherein said one or more transceiver modules atmospherically transmit a second light beam including said respective first data; and an electronic router electronically coupling said secondary transceiver unit to said one or more transceiver modules, wherein said electronic router routes said respective first data from said secondary transceiver unit to said one or more transceiver modules; and a beam deflector control system coupled to said electronic router and said one or more transceiver modules;

wherein each of said one or more transceiver modules comprises:

a light source configured to generate said second light beam; and an X-Y beam deflector configured to receive said second light beam from said light source and deflect said second light beam including said respective first data to a plurality of subscriber transceiver units.

* * * * *

UNITED STATES PATENT AND TRADEMARK OFFICE
CERTIFICATE OF CORRECTION

PATENT NO. : 5,786,923

DATED : July 28, 1998

INVENTOR(S) : Mark A. Doucet and David L. Panak

It is certified that error appears in the above-identified patent and that said Letters Patent is hereby corrected as shown below:

Claim 58, col. 32, line 9, please delete "beams" and substitute "beam;".

Claim 58, col. 32, line 10, please delete "unit" and substitute "unit,".

Signed and Sealed this

Seventeenth Day of November, 1998

BRUCE LEHMAN

Attest:

Attesting Officer

Commissioner of Patents and Trademarks